United States Patent
Shibata et al.

[11] Patent Number: 6,117,361
[45] Date of Patent: Sep. 12, 2000

[54] LIQUID CRYSTAL COMPOUND HAVING FLUORINE-SUBSTITUTED 1,4-PHENYLENE MOIETY, LIQUID CRYSTAL COMPOSITION AND LIQUID CRYSTAL DISPLAY ELEMENT

[75] Inventors: Koichi Shibata; Tomoyuki Kondo; Shuichi Matsui; Kazutoshi Miyazawa, all of Ichihara; Norihisa Hachiya, Yashio; Etsuo Nakagawa, Ichihara, all of Japan

[73] Assignee: Chisso Corp., Osaka-Fu, Japan

[21] Appl. No.: 09/144,082

[22] Filed: Aug. 31, 1998

Related U.S. Application Data

[63] Continuation of application No. PCT/JP97/00580, Feb. 27, 1997.

[30] Foreign Application Priority Data

Feb. 29, 1996 [JP] Japan ..................... 8-071309

[51] Int. Cl.[7] .......................... C09K 19/30; C09K 19/12; C07C 25/00
[52] U.S. Cl. ................. 252/299.63; 252/299.61; 252/299.66; 570/127; 570/131; 570/182; 570/188
[58] Field of Search ........................ 252/299.01, 299.63, 252/299.61, 299.66; 570/127, 131, 182, 188

[56] References Cited

U.S. PATENT DOCUMENTS

| | | | |
|---|---|---|---|
| 4,331,552 | 5/1982 | Eidenschink et al. | 252/299.6 |
| 4,617,141 | 10/1986 | Inoue et al. | 252/299.63 |
| 5,453,864 | 9/1995 | Yamada et al. | 252/299.66 |

FOREIGN PATENT DOCUMENTS

| | | |
|---|---|---|
| 0390395 | 10/1990 | European Pat. Off. . |
| 8908687 | 9/1989 | Germany . |
| 58-219137 | 12/1983 | Japan . |
| 5-501895 | 4/1993 | Japan . |
| 7-292363 | 11/1995 | Japan . |

OTHER PUBLICATIONS

E. Jakeman et al., "Physics Letters", vol. 39A, No. 1, Apr. 10, 1972, pp. 69–70.

"Twisted nematic field–effect liquid–crystal display device," Choaki Iijima and Keiji Wada. *Chemical Abstracts,* vol. 109, No. 10, p. 713. Sep. 5, 1988.

"The effect of lateral fluoro–substitution on the liquid crystal behavior of some 4"–alkylphenylethyl–and trans–4"–alkylcyclohexylethyl–4,4'–distributed biphenyls," G. W. Gray, D. Lacey, J.E. Stanton and K.J. Toyne. *Liquid Crystals,* vol. 1, No. 5, pp. 407–413, 1986.

*Primary Examiner*—Shean C. Wu
*Attorney, Agent, or Firm*—McDermott, Will & Emery

[57] ABSTRACT

A compound represented by the following general formula (1) is provided. This has broader temperature range of nematic phase, lower viscosity and higher miscibility with other liquid crystal compounds at low temperature than those of conventional liquid crystal compounds, and the compounds have high chemical stability.

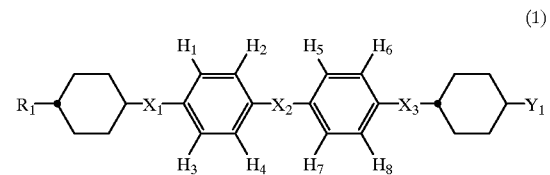

(1)

wherein $H_1$ to $H_8$ represent independently a hydrogen atom or a halogen atom, provided that at least one of them is a halogen atom; $R_1$ represents a moiety which is an alkyl group having 2 to 20 carbon atoms provided that one or more methylene groups ($-CH_2-$) which are not successive in the alkyl group are replaced with an oxygen atom ($-O-$) in the form of ether; $Y_1$ represents an alkyl group having 1 to 20 carbon atoms, and one or more methylene groups in $Y_1$ independently may be replaced with an oxygen atom, a sulfur atom, a dihydroxysilyl group, a dimethylsililene group, $-CH=CH-$ or $-C\equiv C-$; $X_1$ to $X_3$ represent independently a covalent bond, a 1,2-ethylene group or a 1,4-butylene group.

10 Claims, No Drawings

LIQUID CRYSTAL COMPOUND HAVING FLUORINE-SUBSTITUTED 1,4-PHENYLENE MOIETY, LIQUID CRYSTAL COMPOSITION AND LIQUID CRYSTAL DISPLAY ELEMENT

REFERENCE TO RELATED APPLICATION

This Application is a continuation of International Application No. PCT/JP97/00580, whose international filing date is Feb. 27, 1997, which in turn claims the benefit of Japanese Patent Application No. 8-071309, filed Feb. 29, 1996, the disclosures of which Applications are incorporated by reference herein. The benefit of the filing and priority dates of the International and Japanese Applications is respectfully requested.

FIELD OF THE INVENTION

This invention relates to a novel liquid crystal compound having various characteristics suitable for electro-optical display material, and a liquid crystal composition using the above novel liquid crystal compound, and in particular a novel liquid crystal compound having a broad temperature range of nematic phase and high clearing point, and a novel liquid crystal composition using the above compound and having a broad operating temperature range of operation thereof.

PRIOR ART

Liquid crystal display elements are used in watches, electronic calculator, various kinds of measuring apparatuses, automotive panels, word processors, electronic notebooks, printers, computers, televisions, etc. Liquid crystal display elements utilize optical anisotropy and dielectric anisotropy of liquid crystal materials. Display systems now often used include a dynamic scattering (DS) mode, a guest-host (GH) mode, a twisted nematic (TN) mode, a super twisted nematic (STN) mode and a thin film transistor (TFT) mode, ferroelectric liquid crystal (FLC) mode and the like. Operation systems now used include a static driving system, a dynamic driving system, an active matrix driving system, a dual-frequency driving system and the like.

Among them, an interest is taken most in an active matrix driving system using TFT system, and STN system, because of high display performance thereof.

Although various characteristics are required for liquid crystal compounds employing in TFT system and STN system, the following characteristics are particularly important in TFT system:
1) it has a broad temperature range of nematic phase to perform a broad operating temperature range, reduction of temperature range of nematic phase is not caused when added to a liquid crystal composition, or a phase separation such as deposition of crystals hardly occurs at a low temperature region,
2) it has low viscosity to perform rapid response, and
3) it has large dielectric anisotropy to perform low electric power consumption, or it has low threshold voltage,
and the following characteristics are particularly important in STN system:
1) it has a broad temperature range of nematic phase, reduction of temperature range of nematic phase is not caused when added to a liquid crystal composition, or a phase separation such as deposition of crystals hardly occurs at a low temperature region,
2) it has low viscosity, and
3) it has a large elastic coefficient ratio ($K_{33}/K_{11}$) to perform steep threshold value properties.

In order to realize the above required characteristics, a compound having very large dielectric anisotropy or very large elastic coefficient ratio ($K_{33}/K_{11}$) is usually used to prepare a liquid crystal composition, however, it is very difficult to realize broad temperature range of nematic phase and low viscosity at the same time when a liquid crystal composition consists of merely these compounds.

In this case, a compound having very low viscosity and a liquid crystal compound having very broad temperature range of nematic phase, in particular high clearing point is used as base liquid crystals, and a liquid crystal compound having a specific dielectric anisotropy or a specific elastic coefficient ratio ($K_{33}/K_{11}$) is mixed thereto in a suitable amount, so that desirable characteristics are obtained.

In particular, viscosity is a very important factor to govern the response speed of liquid crystal molecules oriented in a liquid crystal panel against the electric field (Phys. Lett., 39A, 69 (1972). A liquid crystal composition exhibiting a large response speed has high quality of display, and such composition is most required at present. Further, there is also a need for small temperature-dependency of response speed, that is, small temperature-dependency of viscosity, since reduction of quality of display is not caused at a low temperature. It is important in particular that low viscosity is maintained at a low temperature.

In order to obtain a liquid crystal composition capable of operating at a broad temperature range, it is in need of a liquid crystal compound having a temperature range which is as broad as possible, that is, S-N point or a melting point which is as low as possible, a clearing point which is as high as possible, and temperature range of nematic phase which is as broad as possible.

Further, in order to realize required characteristics in individual display elements, a liquid crystal compound consists of a mixture of from several to twenty (20) kinds of liquid crystal compounds. Accordingly, miscibility with other liquid crystal compounds, in particular, favorable miscibility at low temperature is required, since liquid crystal compounds are used recently in extended circumstance.

That is, in order to enable the use of liquid crystal composition at broad range of temperature, it is necessary that the liquid crystal composition has nematic phase at a low temperature, and there is a need for a liquid crystal composition which does not exhibit deposition of crystals or expression of smectic phase. For this purpose, it is very important that a liquid crystal compound used has high miscibility with another compound at a low temperature.

In order to satisfy the above requirements, four-rings compounds have been already disclosed. J. P. KOKOKU No. Hei 3-16331 discloses a compound represented by the following formula (a):

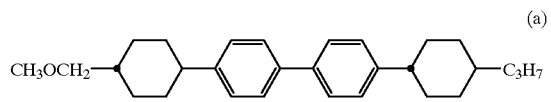

(a)

and J. P. KOKOKU No. Sho 62-46527 discloses a compound represented by the following formula (b):

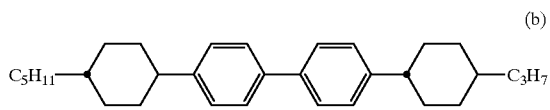

(b)

However, these compounds do not satisfy the required characteristics such as a broad temperature range of nematic phase, and there is a need for a novel liquid crystal compound suitable for a base compound having more excellent properties.

A liquid crystal compound used in a liquid crystal composition is required to be stable against ambient factors such as water, air, heat, light, etc.

A liquid crystal composition for an active matrix liquid crystal display which comprises an integrated nonlinear element for switching individual image points, in particular, a liquid crystal composition designed for TFT, must have very high specific resistance (high voltage holding ratio), good UV stability, in addition to large positive value of dielectric anisotropy.

Active matrix liquid crystal display is suitable for, in particular, advanced information displays for television or computer, or advanced information displays used in automobiles or aircrafts. However, if a liquid crystal compound or a liquid crystal composition which does not have very high specific resistance (high voltage holding ratio), and good UV stability, is used, electrical resistance in a liquid crystal panel is reduced which leads to reduction of contrast to thereby cause "after image extinction". High electrical resistance of a liquid crystal composition is very important factor which governs a use-life in case of low voltage drive. Accordingly, very high specific resistance (high voltage holding ratio), and good UV stability are very important characteristics required for a liquid crystal compound used.

Accordingly, in order to provide a liquid crystal composition having excellent characteristics, there is a need for a novel liquid crystal compound having broader temperature range of a nematic phase, lower viscosity, better miscibility with other liquid crystal compounds at a low temperature as well as higher chemical stability.

DISCLOSURE OF THE INVENTION

Thus, an object of the invention is to provide a novel liquid crystal compound having broader temperature range of a nematic phase, lower viscosity, better miscibility with other liquid crystal compounds, and higher chemical stability simultaneously, a liquid crystal composition comprising the above compound and exhibiting excellent characteristics, and a liquid crystal display element using said liquid crystal composition.

The inventors of the present invention made an effort to solve the above-mentioned problems and then they have found a compound which has a novel structure and improved characteristics as compared with known liquid crystal compounds.

That is, the inventors have found that a specific four-rings compound exhibits a very broad temperature range of nematic phase, said four-rings compound having simultaneously (i) an alkyl group wherein one or more methylene groups which are not successive are replaced with an oxygen atom in the form of ether and (ii) a halogen atom-substituted benzene ring, and based on which they have completed the present invention.

Thus, the present invention provides a compound of the following general formula (1):

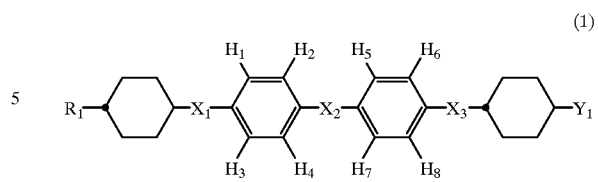

(1)

wherein $H_1$, $H_2$, $H_3$, $H_4$, $H_5$, $H_6$, $H_7$ and $H_8$ represent independently a hydrogen atom or a halogen atom, provided that at least one of them is a halogen atom; $R_1$ represents a moiety which is an alkyl group having 2 to 20 carbon atoms provided that one or more methylene groups (—$CH_2$—) which are not successive in the alkyl group are replaced with an oxygen atom (—O—) in the form of ether; $Y_1$ represents an alkyl group having 1 to 20 carbon atoms, and one or more methylene groups in $Y_1$ independently may be replaced with an oxygen atom, a sulfur atom, a dihydroxysilyl group, a dimethylsilylene group, —CH=CH— or —C≡C—; $X_1$, $X_2$ and $X_3$ represent independently a covalent bond, a 1,2-ethylene group or a 1,4-butylene group.

Preferred compounds of the present invention are those of the formula (1) wherein $Y_1$ is an alkyl group having 1 to 20 carbon atoms.

More preferred compounds of the present invention are those of the formula (1) wherein $H_1$, $H_2$, $H_3$, $H_4$, $H_5$, $H_6$, $H_7$ and $H_8$ represent independently a hydrogen atom or a halogen atom, at least one of them is a fluorine atom.

More preferred compounds of the present invention are those of the formula (1) wherein all $X_1$, $X_2$ and $X_3$ are covalent bonds.

More preferred compounds of the present invention are those of the formula (1) wherein any one of $X_1$, $X_2$ and $X_3$ is a 1,2-ethylene group.

The present invention also provides a liquid crystal composition which comprises at least one compound of the formula (1).

The present invention further provides a liquid crystal composition which comprises at least one compound of the formula (1) as a first component and at least one compound selected from the group consisting of the compounds of the following formulas (2), (3) and (4) as a second component.

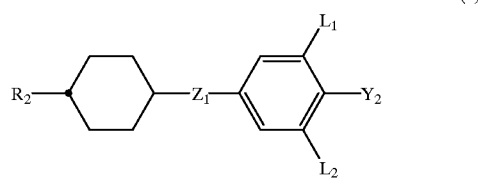

(2)

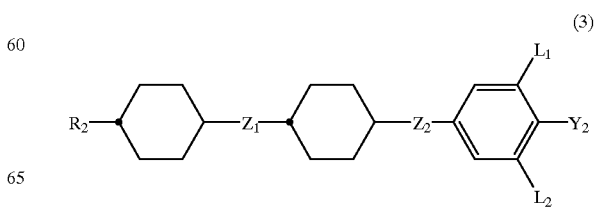

(3)

-continued

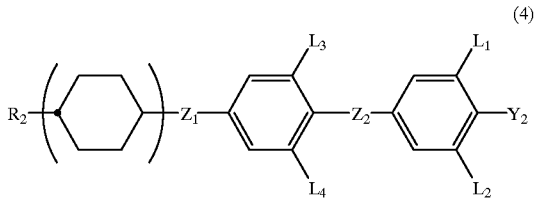
(4)

wherein $R_2$ represents an alkyl group having 1 to 10 carbon atoms; $Y_2$ represents a fluorine atom, a chlorine atom, $OCF_3$, $OCF_2H$, $CF_3$, $CF_2H$ or $CFH_2$; $L_1$, $L_2$, $L_3$ and $L_4$ represent independently a hydrogen atom or a fluorine atom; $Z_1$ and $Z_2$ represent independently a 1,2-ethylene group, —CH=CH— or a covalent bond; and a is 1 or 2.

The present invention further provides a liquid crystal composition which comprises at least one compound of the formula (1) as a first component and at least one compound selected from the group consisting of the compounds of following formulas (5), (6), (7), (8) and (9) as a second component.

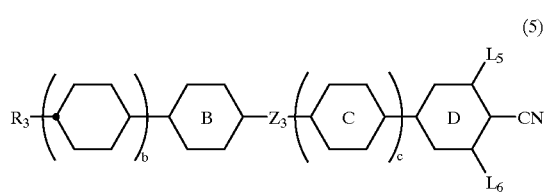
(5)

wherein $R_3$ is a fluorine atom, an alkyl group having 1 to 10 carbon atoms or an alkenyl group having 2 to 10 carbon atoms, and any methylene group in said alkyl or alkenyl group may be replaced by one or more oxygen atoms (—O—), provided that two or more successive methylene groups are not replaced by oxygen atoms; ring B represents 1,4-cyclohexylene, 1,4-phenylene or 1,3-dioxane-2,5-diyl; ring C represents 1,4-cyclohexylene, 1,4-phenylene or pyrimidine-2,5-diyl; ring D represents 1,4-cyclohexylene or 1,4-phenylene; $Z_3$ represents a 1,2-ethylene group, —COO— or a covalent bond; $L_5$ and $L_6$ represent independently a hydrogen atom or a fluorine atom; and b and c represent independently 0 or 1.

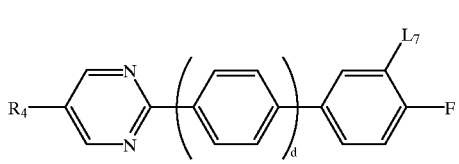
(6)

wherein $R_4$ represents an alkyl group having 1 to 10 carbon atoms; $L_7$ represents a hydrogen atom or a fluorine atom; and d represents 0 or 1.

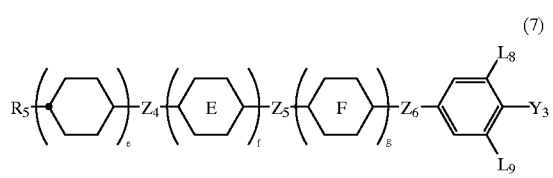
(7)

wherein $R_5$ represents an alkyl group having 1 to 10 carbon atoms, ring E and ring F represent independently 1,4-cyclohexylene or 1,4-phenylene; $Z_4$ and $Z_5$ represent independently —COO— or a covalent bond; $Z_6$ represents —COO— or —C≡C—; $L_8$ and $L_9$ represent independently a hydrogen atom or a fluorine atom; $Y_3$ represents a fluorine atom, $OCF_3$, $OCF_2H$, $CF_3$, $CF_2H$ or $CFH_2$; and e, f and g represent independently 0 or 1.

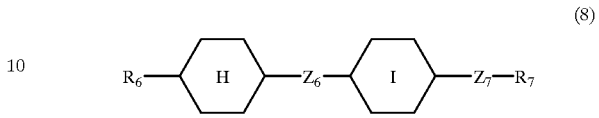
(8)

wherein $R_6$ and $R_7$ represent independently an alkyl group having 1 to 10 carbon atoms or an alkenyl group having 2 to 10 atoms, and any methylene group in said alkyl or alkenyl group may be replaced by one or more oxygen atoms, provided that two or more successive methylene groups are not replaced by oxygen atoms; ring H represents 1,4-cyclohexylene, 1,4-phenylene or pyrimidine-2,5-diyl; ring I represents 1,4-cyclohexylene or 1,4-phenylene; $Z_6$ represents —C≡C—, —COO—, a 1,2-ethylene group, —CH=CH—C≡C— or a covalent bond; and $Z_7$ represents —COO— or a covalent bond.

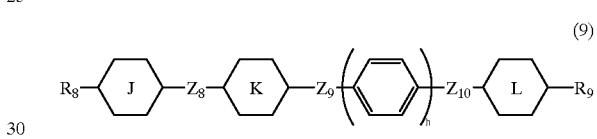
(9)

wherein $R_8$ and $R_9$ represent independently an alkyl group having 1 to 10 carbon atoms or an alkenyl group having 2 to 10 atoms, and any methylene group in said alkyl or alkenyl group may be replaced by one or more oxygen atoms, provided that two or more successive methylene groups are not replaced by oxygen atoms; ring J represents 1,4-cyclohexylene, 1,4-phenylene or pyrimidine-2,5-diyl; ring K represents 1,4-cyclohexylene, 1,4-phenylene wherein at least one or more hydrogen atoms on the ring are optionally substituted by fluorine atoms, or pyrimidine-2,5-diyl; ring L represents 1,4-cyclohexylene or 1,4-phenylene; $Z_8$ and $Z_{10}$ represent independently —COO—, a 1,2-ethylene group or a covalent bond; $Z_9$ represents —CH=CH—, —C≡C—, —COO— or a covalent bond; and h represents 0 or 1.

The present invention further provides a liquid crystal composition which comprises at least one compound of the formula (1) as first component, and as a second component at least one compound selected from the group consisting of the compounds of the formulas (2), (3), and (4) and at least one compound selected from the group consisting of the compounds of the formulas (5), (6), (7), (8) and (9).

The present invention further provides a liquid crystal display element comprising the liquid crystal composition mentioned above.

BEST MODE FOR CARRYING OUT THE INVENTION

The compound of the formula (1) of the present invention is a four-rings compound having simultaneously (i) an alkyl group wherein one or more methylene groups which are not successive are replaced with an oxygen atom in the form of ether and (ii) a halogen atom(s)-substituted benzene ring, and more specifically a compound represented by the following formulas (1-1) to (1-8) wherein $R_1$, $Y_1$, $H_1$, $H_2$, $H_3$, $H_4$, $H_5$, $H_6$, $H_7$ and $H_8$ are the same as defined above.

Thus, the compound of the formula (1) includes a four-rings compound of the formula (1-1) wherein all the rings are connected by covalent bonds, four-rings compounds of the formulas (1-2) to (1-4) comprising one 1,2-ethylene bond, four-rings compounds of the formulas (1-5) to (1-7) comprising one 1,4-butylene bond and, a four-rings compound of formula (1-8) comprising two 1,2-ethylene bonds.
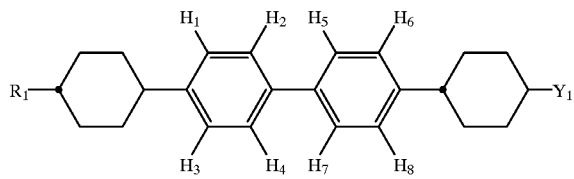
(1-1)
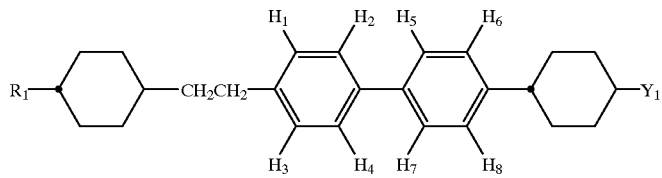
(1-2)
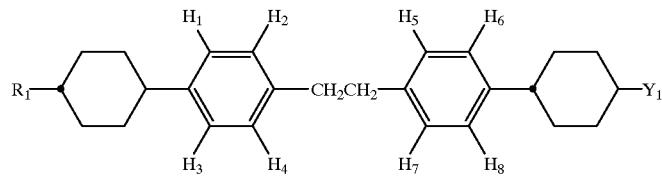
(1-3)
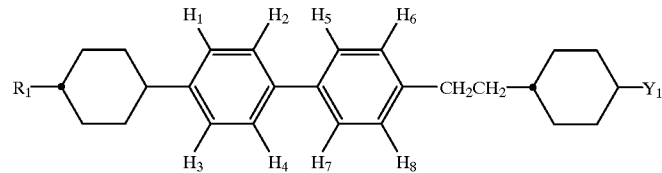
(1-4)
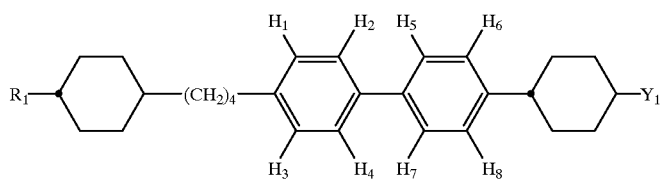
(1-5)
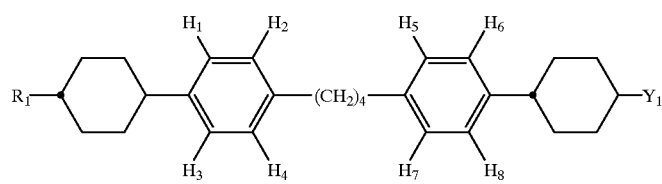
(1-6)
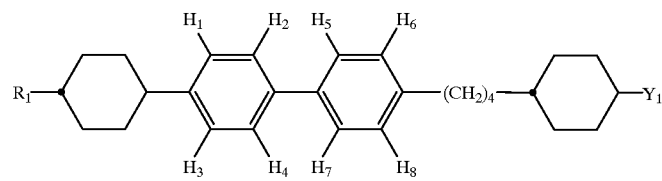
(1-7)

-continued (1-8)

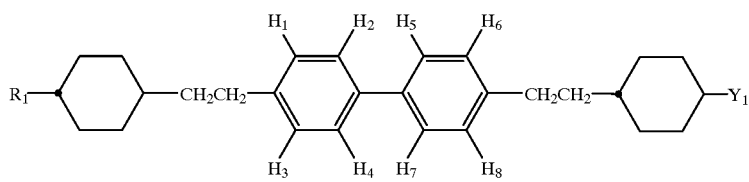

$R_1$ in the formula (1) representing the compound of the present invention is a moiety which is an alkyl group having 2 to 20 carbon atoms provided that one or more methylene groups which are not successive in the alkyl group are replaced with an oxygen atom in the form of ether. Preferred $R_1$ includes specifically a methoxymethyl group, an ethoxymethyl group, a propoxymethyl group, a butoxymethyl group, a pentoxymethyl group, a hexyloxymethyl group, a heptyloxymethyl group, an octyloxymethyl group, a methoxyethyl group, an ethoxyethyl group, a propoxyethyl group, a pentoxyethyl group, hexyloxyethyl group, a methoxypropyl group, an ethoxypropyl group, a propoxypropyl group, a pentoxypropyl group, a hexyloxypropyl group, a heptyloxypropyl group, methoxybutyl group, an ethoxybutyl group, a propoxybutyl group, a butoxybutyl group, a pentoxybutyl group, a methoxypentyl group, an ethoxypentyl group, a propoxypentyl group, a pentoxypentyl group, a methoxymethoxy group, an ethoxymethoxy group, propoxymethoxy group, a butoxymethoxy group, a pentoxymethoxy group, a hexyloxymethoxy group, a heptyloxymethoxy group, an octyloxymethoxy group, a methoxyethoxy group, an ethoxyethoxy group, a propoxyethoxy group, a butoxyethoxy group, a pentoxyethoxy group, a hexyloxyethoxy group, a methoxypropoxy group, an ethoxypropoxy group, a propoxypropoxy group, a pentoxypropoxy group, a hexyloxypropoxy group, a heptyloxypropoxy group, a methoxybutoxy group, an ethoxybutoxy group, a propoxybutoxy group, a butoxybutoxy group, a pentoxybutoxy group, a methoxypentoxy group, an ethoxypentoxy group, a propoxypentoxy group, and a pentoxypentoxy group.

$H_1$, $H_2$, $H_3$, $H_4$, $H_5$, $H_6$, $H_7$ and $H_8$ on the benzene ring represent independently a hydrogen atom or a halogen atom, provided that at least one of them is a halogen atom. The halogen atom represents a fluorine atom, a chlorine atom, a bromine atom or an iodine atom, preferably a fluorine atom or a chlorine atom, and more preferably a fluorine atom.

One or more of $H_1$, $H_2$, $H_3$, $H_4$, $H_5$, $H_6$, $H_7$ and $H_8$ represent halogen atoms, and preferred are the compounds of the formula (1) wherein from one to four of $H_1$, $H_2$, $H_3$, $H_4$, $H_5$, $H_6$, $H_7$ and $H_8$ represent halogen atoms, and more preferred are the compounds of the formula (1) wherein from one or two of $H_1$, $H_2$, $H_3$, $H_4$, $H_5$, $H_6$, $H_7$ and $H_8$ represent halogen atoms in the light of viscosity.

$Y_1$ represents an alkyl group having 2 to 20 carbon atoms, and one or more methylene groups in $Y_1$ independently may be replaced with an oxygen atom, a sulfur atom, a dihydroxysilyl group, a dimethylsililene group, —CH═CH— or —C≡C—. Preferred $Y_1$ is an alkyl group having 1 to 20 carbon atoms, an alkoxy group having 1 to 19 carbon atoms, an alkoxyalkyl group having 2 to 19 carbon atoms or an alkenyl group having 2 to 21 carbon atoms, more preferred is an alkyl group or an alkoxy group having 1 to 10 carbon atoms, or an alkoxyalkyl, alkenyl or alkynyl group having 2 to 10 carbon atoms, and particularly preferred is an alkyl group or an alkoxy group having 1 to 10 carbon atoms, or an alkoxyalkyl group having 2 to 10 carbon atoms.

If $Y_1$ represents an unsaturated group (an alkenyl group or an alkynyl group), a 1-alkenyl group, a 3-alkenyl group, a 1-alkynyl group or a 3-alkynyl is preferable.

The compound represented by the formula (1) according to the present invention has broad temperature range of nematic phase, low viscosity, high chemical stability and high miscibility with other liquid crystal compounds, and the compound is very important as an element of a liquid crystal composition.

The compound represented by the formula (1) has remarkably broader temperature range of nematic phase than those of known liquid crystal compounds. The compound of the formula (1) has specifically a remarkably lower melting point (C-N point) or S-N point than those of known analogous compounds, and the compound of the formula (1) also has remarkably broader temperature range of nematic phase than those of known analogous compounds.

Any of the compound represented by the formula (1) according to the present invention shows low viscosity and when the compound is used in the liquid crystal compound in a large amount, viscosity of the composition does not increase remarkably. Temperature-dependency of the viscosity, and more specifically the temperature-dependency at low temperature is very small.

Any of the compound represented by the formula (1) according to the present invention shows high solubility to other liquid crystal compounds and liquid crystal compositions, a liquid crystal composition using the compound represented by the formula (1) does not lack nematic phase at a low temperature, for example, at −20° C. required in practice.

Any of the compound represented by the formula (1) according to the present invention is chemically very stable and a liquid crystal composition using the compound shows a very high specific resistance and a large voltage holding ratio. The compound exhibits very high stability against UV light and heating.

Since the compound represented by the formula (1) according to the present invention has excellent characteristics described above, it can be used suitably for TFT, STN and other display systems. For example, it is also suitable as a liquid crystal compound for TN mode, guest-host mode, liquid crystal display element of polymer-dispersed mode and dynamic scattering mode.

The liquid crystal composition of the present invention preferably comprises at least one compound of the formula (1) in the amount of 0.1 to 99% by weight to produce excellent characteristics.

More preferably, in addition to the compound of the formula (1) as a first component, the liquid crystal composition of the present invention comprise at least one compound selected from the group consisting of the compounds of the formulas (2) to (4) according to the purpose of the liquid crystal composition.

Examples of the compounds of the formulas (2) to (4) used in the present invention include preferably the following compounds. ($R_2$ is the same as defined above.)

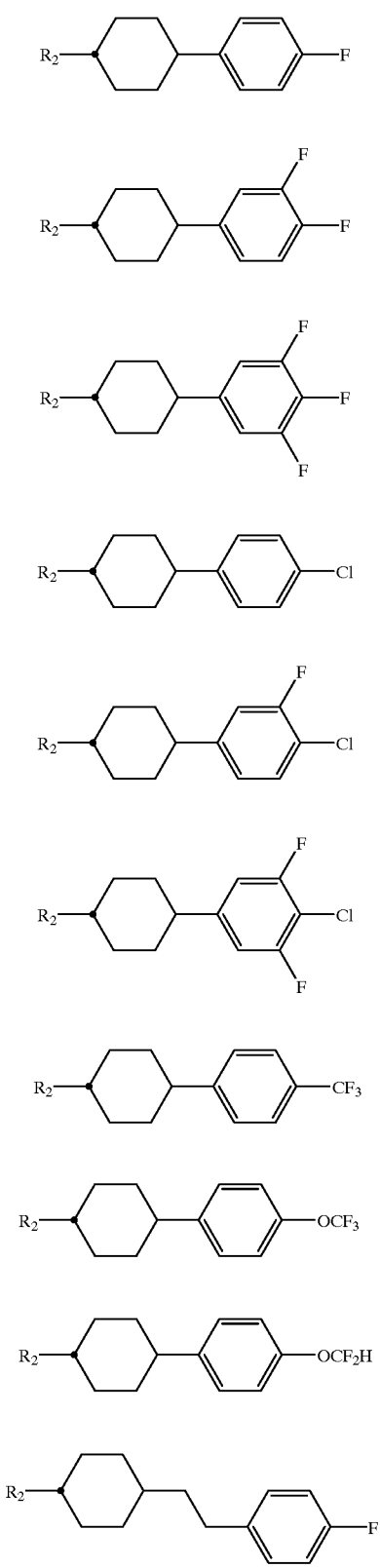

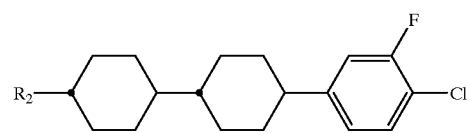
(3-5)
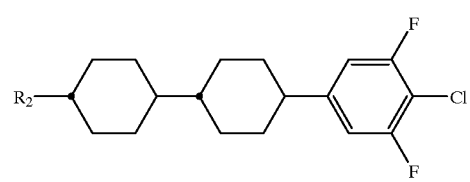
(3-6)
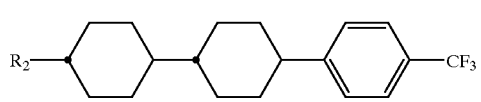
(3-7)
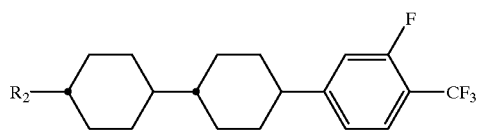
(3-8)
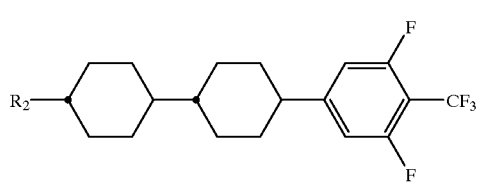
(3-9)
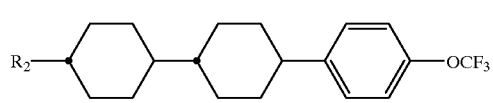
(3-10)
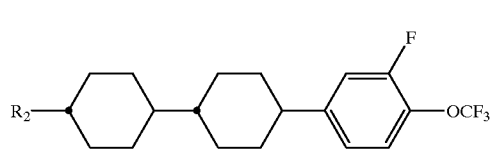
(3-11)
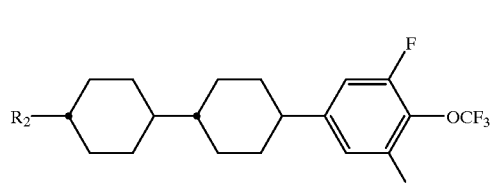
(3-12)
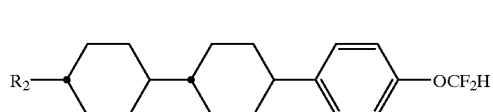
(3-13)
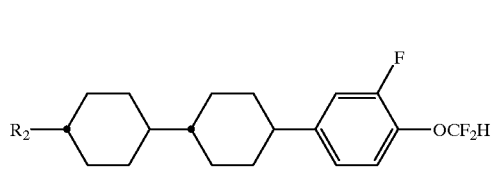
(3-14)
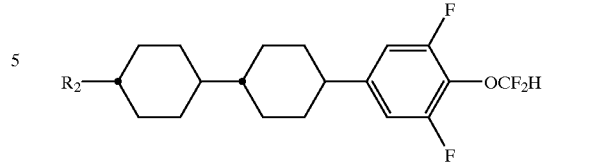
(3-15)
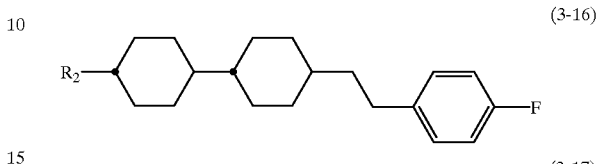
(3-16)
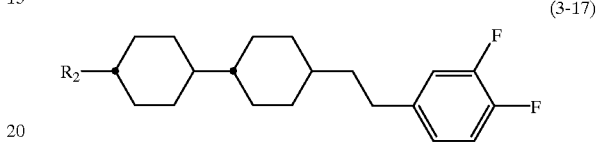
(3-17)
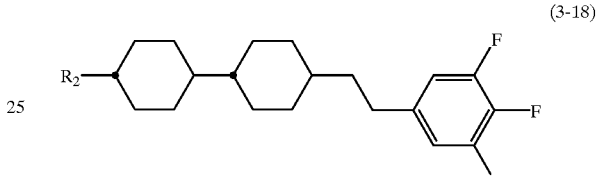
(3-18)
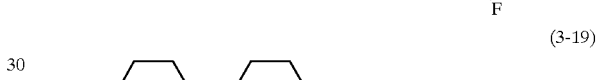
(3-19)
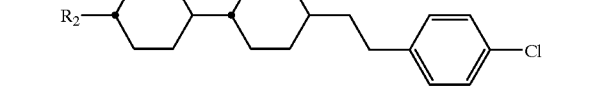
(3-20)
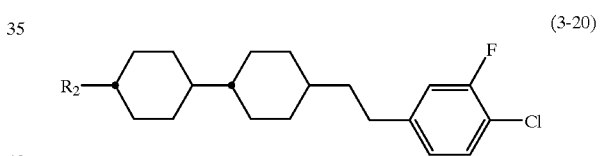
(3-21)
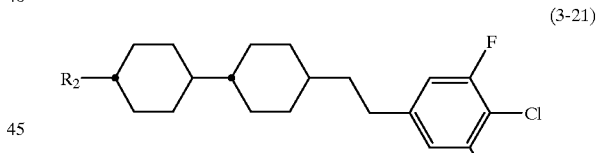
(3-22)
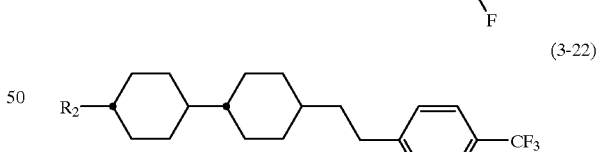
(3-23)
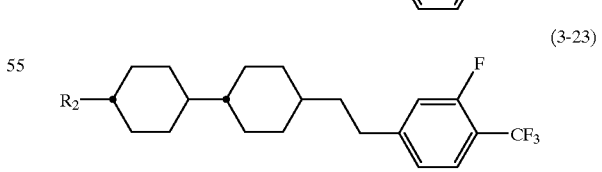
(3-24)
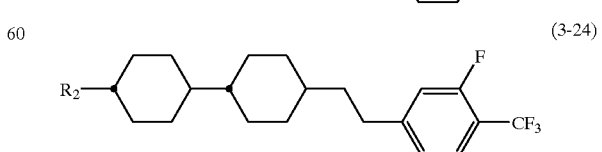

(3-25) 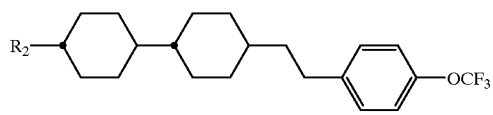
(3-26) 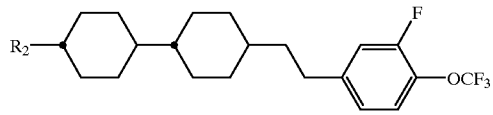
(3-27) 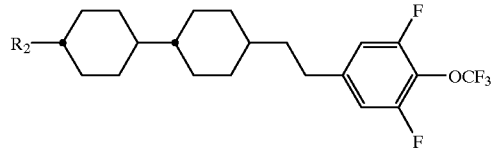
(3-28) 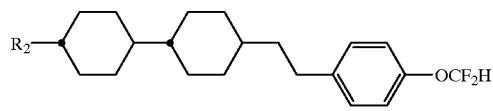
(3-29) 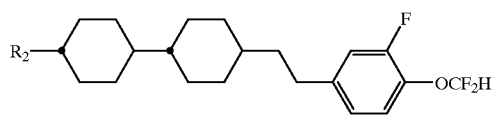
(3-30) 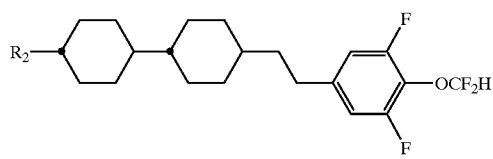
(3-31) 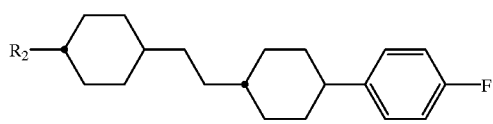
(3-32) 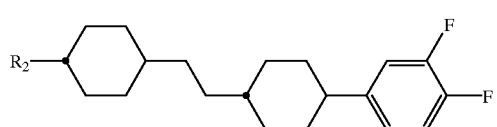
(3-33) 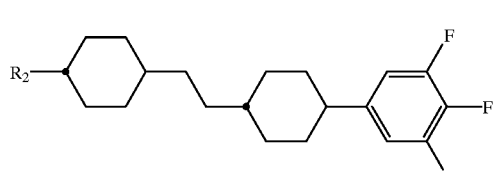
(3-34) 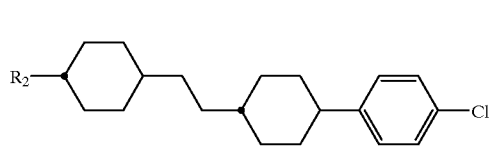
(3-35) 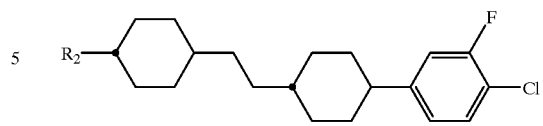
(3-36) 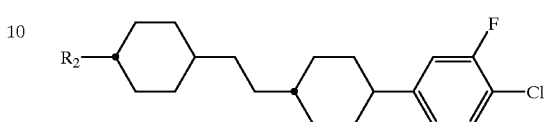
(3-37) 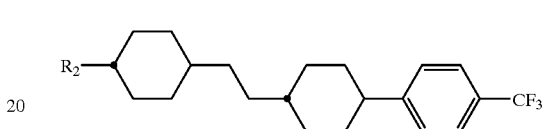
(3-38) 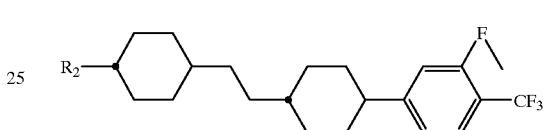
(3-39) 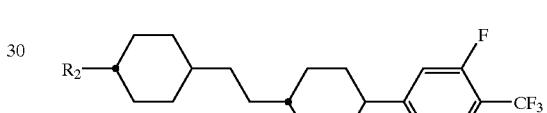
(3-40) 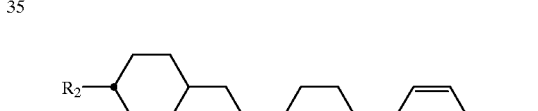
(3-41) 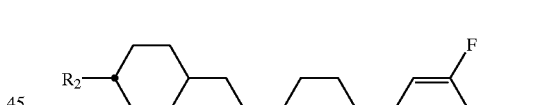
(3-42) 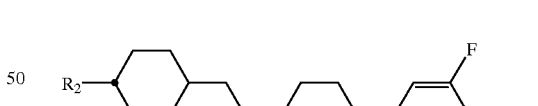
(3-43) 
(3-44) 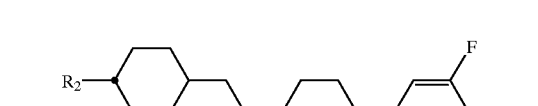

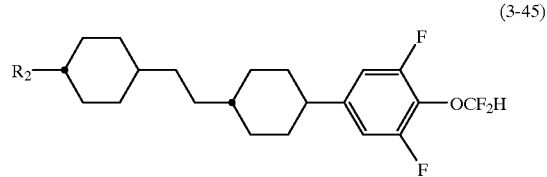
(3-45)
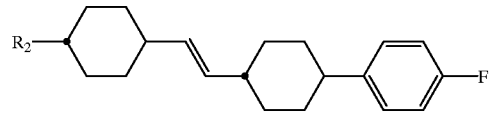
(3-46)
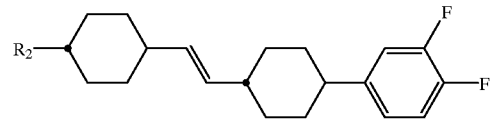
(3-47)
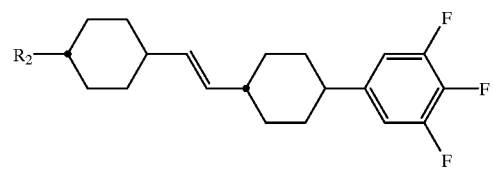
(3-48)
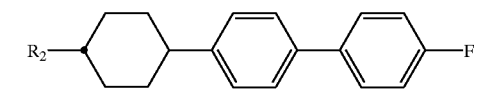
(4-1)
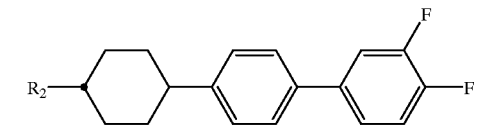
(4-2)
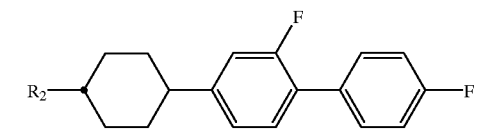
(4-3)
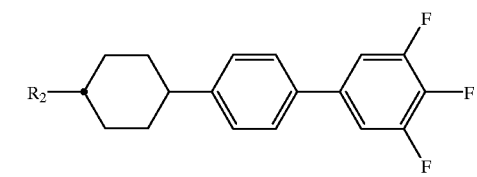
(4-4)
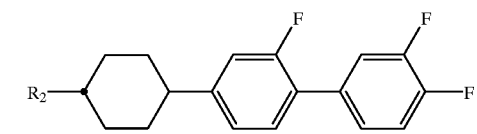
(4-5)
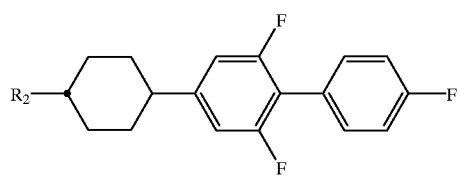
(4-6)
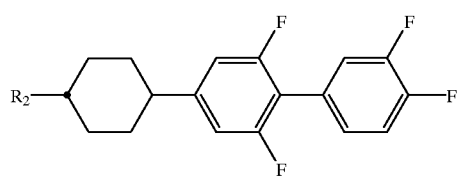
(4-7)
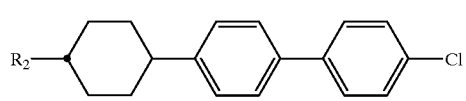
(4-8)
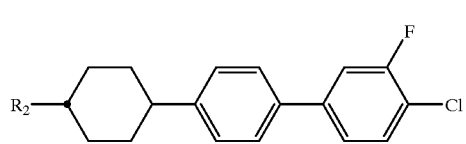
(4-9)
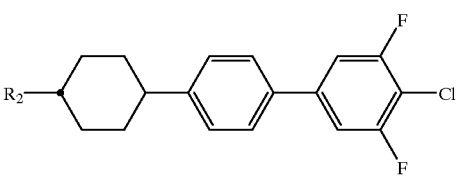
(4-10)
(4-11)
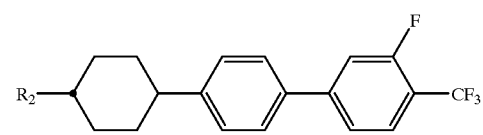
(4-12)
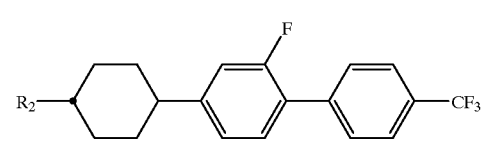
(4-13)
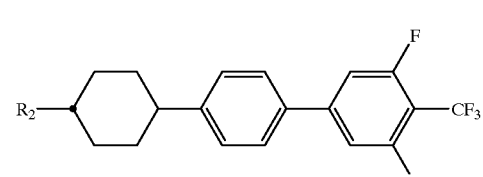
(4-14)

(4-15)
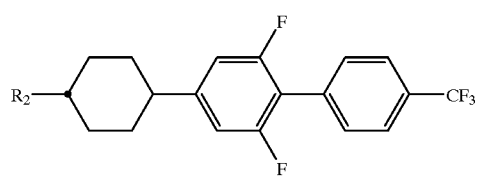
(4-16)
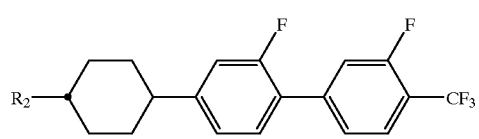
(4-17)
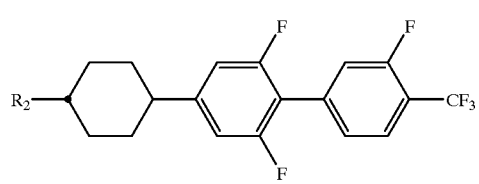
(4-18)
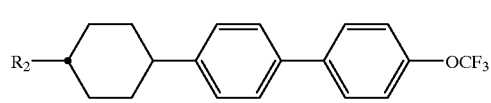
(4-19)
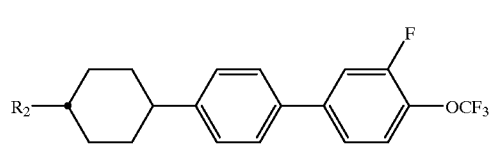
(4-20)
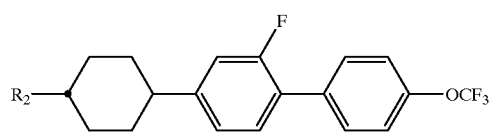
(4-21)
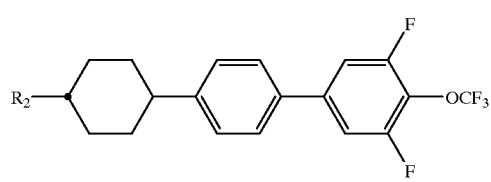
(4-22)
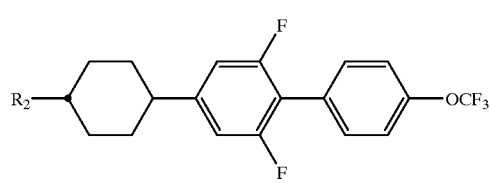
(4-23)
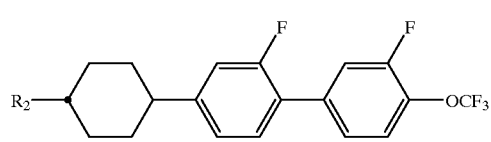
(4-24)
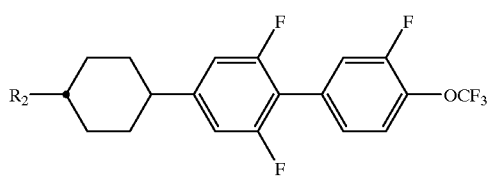
(4-25)
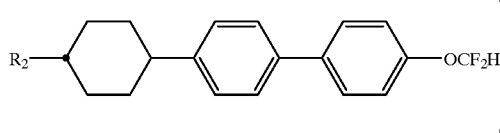
(4-26)
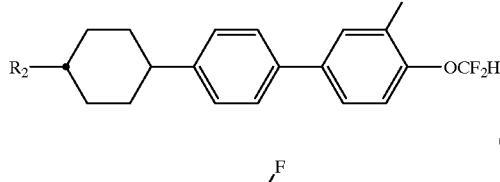
(4-27)
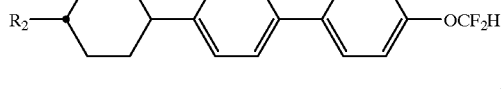
(4-28)
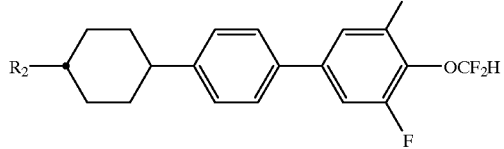
(4-29)
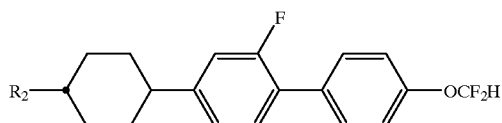
(4-30)
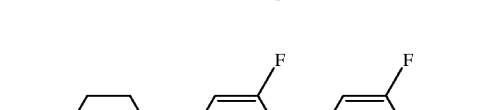
(4-31)
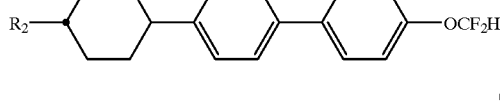
(4-32)
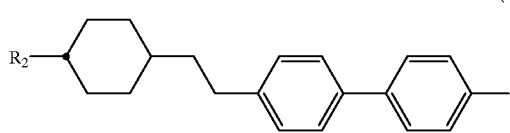

(4-33) 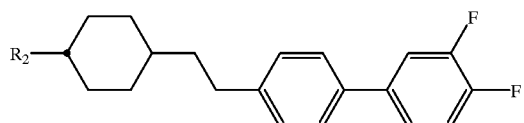
(4-34) 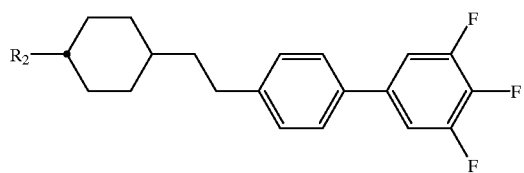
(4-35) 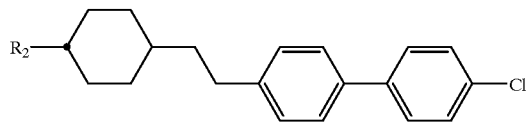
(4-36) 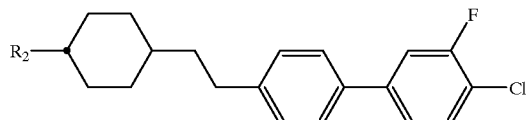
(4-37) 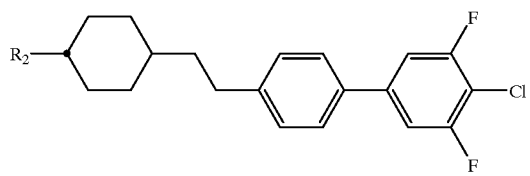
(4-38) 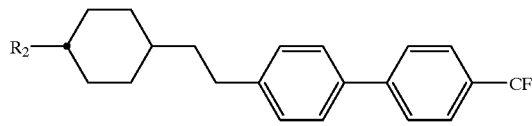
(4-39) 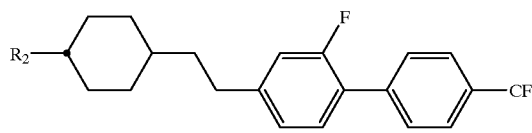
(4-40) 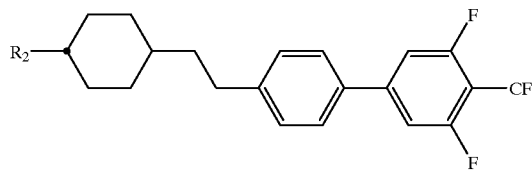
(4-41) 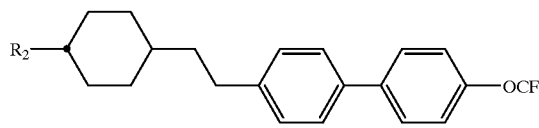
(4-42) 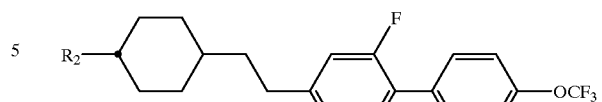
(4-43) 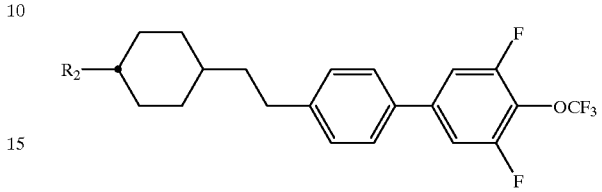
(4-44) 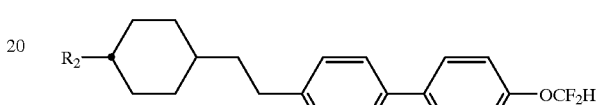
(4-45) 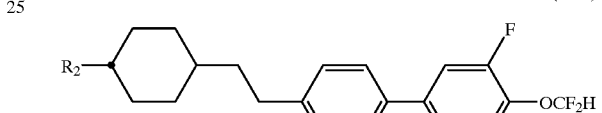
(4-46) 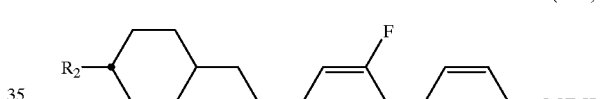
(4-47) 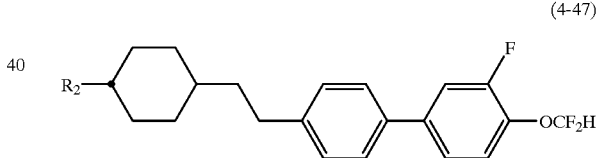
(4-48) 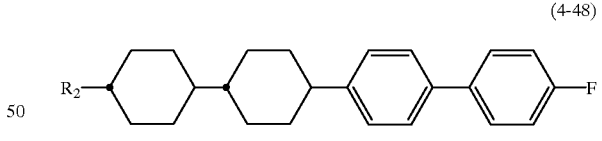
(4-49) 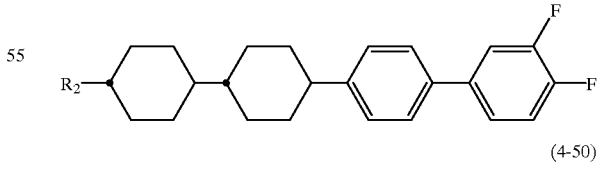
(4-50) 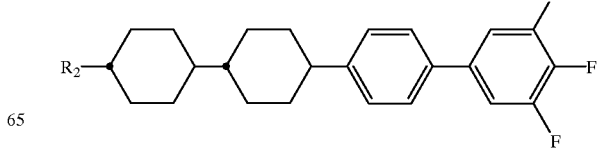

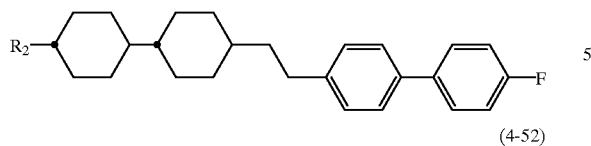
(4-51)

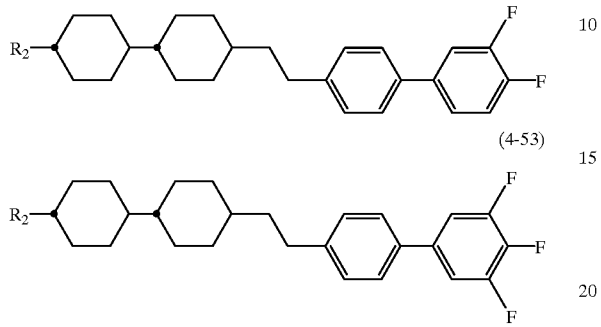
(4-52)

(4-53)

The compounds represented by the formula (2) to (4) show positive value of dielectric anisotropy and have very good heat stability and chemical stability. Thus these compounds are essential to prepare a liquid crystal composition suitable for TFT (AM-LCD) which requires a large voltage holding-ratio and high reliability such as a large specific resistance.

The amount of the compounds represented by the formula (2) to (4) used for the preparation of a liquid crystal composition for TFT mode is suitably 1 to 99% by weight, preferably 10 to 97% by weight, and more preferably 40 to 95% by weight based on the total weight of the liquid crystal composition. In this case, the liquid crystal composition may also contain additionally the compounds represented by the formula (5) to (9). The compounds represented by the formula (2) to (4) may also be used to prepare a liquid crystal composition for STN display mode or for usual TN display mode.

Examples of the compounds represented by the formulas (5) to (7) used in the present invention include preferably the following compounds. ($R_3$ to $R_5$ are the same as defined above.)

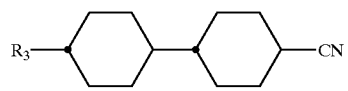
(5-1)

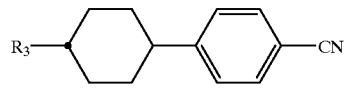
(5-2)

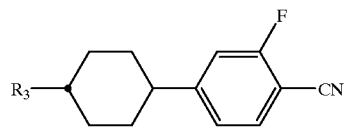
(5-3)

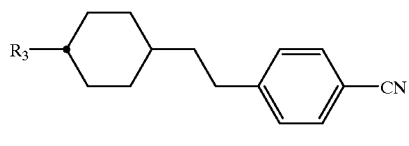
(5-4)

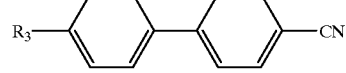
(5-5)

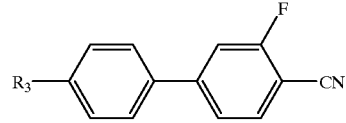
(5-6)

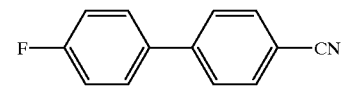
(5-7)

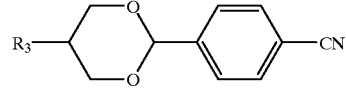
(5-8)

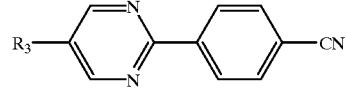
(5-9)

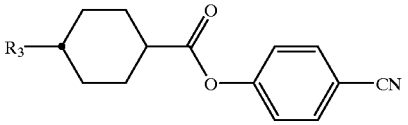
(5-10)

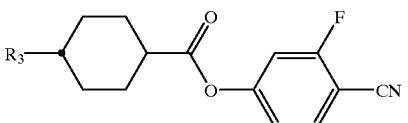
(5-11)

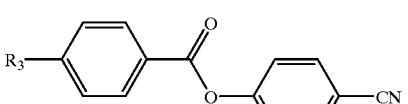
(5-12)

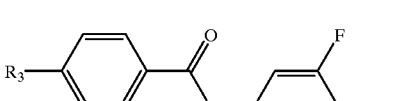
(5-13)

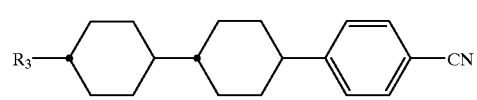
(5-14)

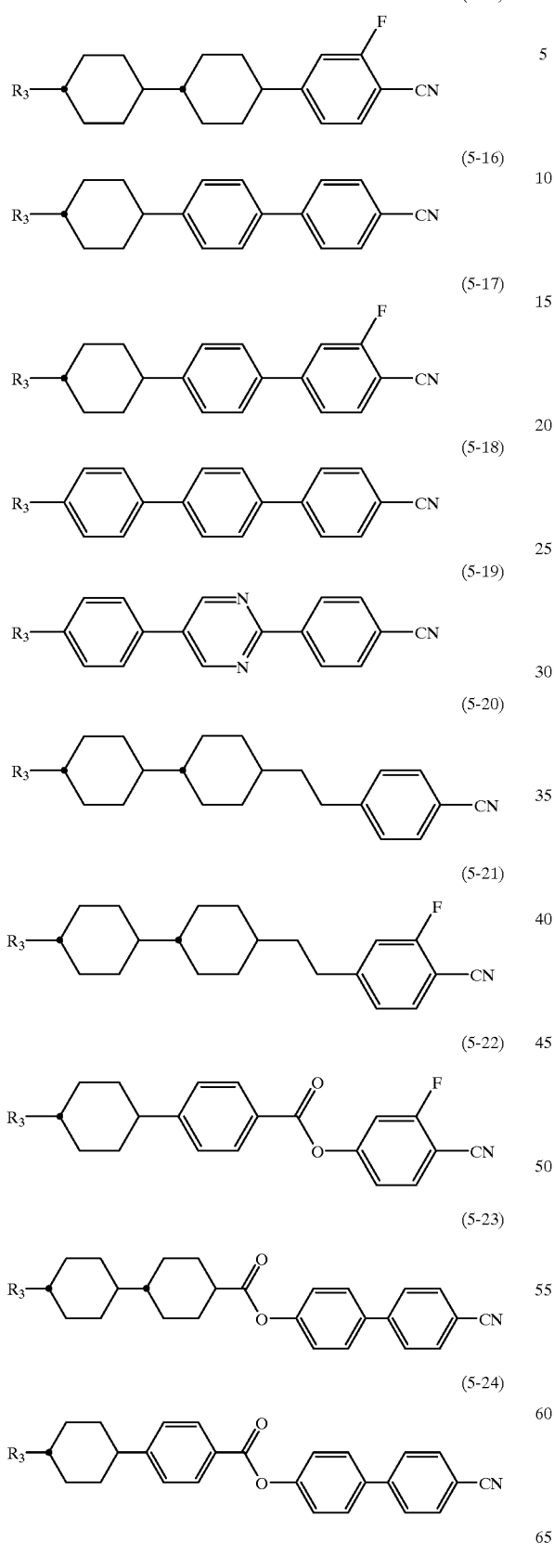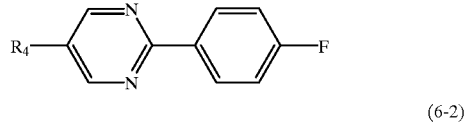

(7-8)

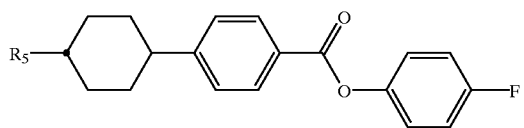

(7-9)

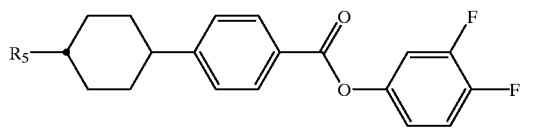

(7-10)

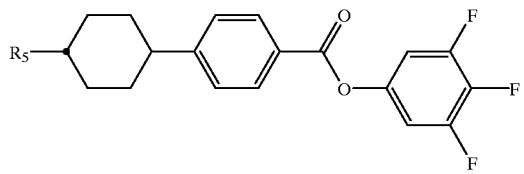

(7-11)

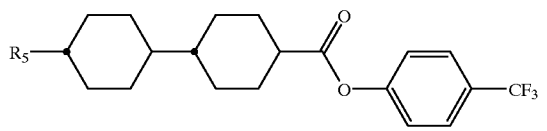

(7-12)

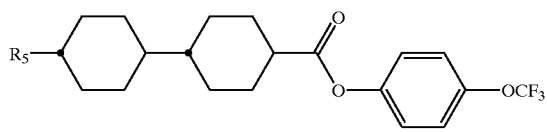

(7-13)

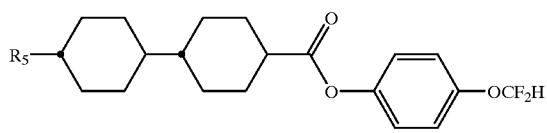

(7-14)

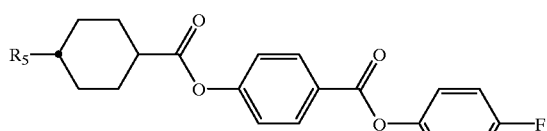

(7-15)

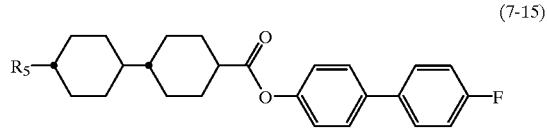

(7-16)

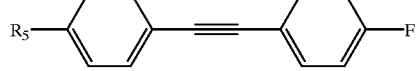

(7-17)

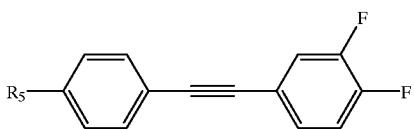

The compounds represented by the formulas (5) to (7) have positive and large value of dielectric anisotropy and these compounds are used especially for decreasing threshold voltage. These compounds are also used for adjusting viscosity and optical anisotropy (Δn) and broadening nematic phase temperature range such as heightening a clearing point, as well as for improving steepness.

Examples of the compounds represented by the formulas (8) to (9) used in the present invention include preferably the following compounds. ($R_6$ to $R_9$ are the same as defined above.)

(8-1)

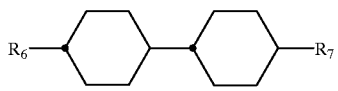

(8-2)

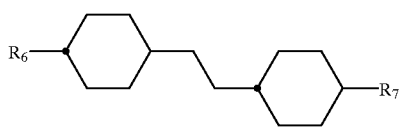

(8-3)

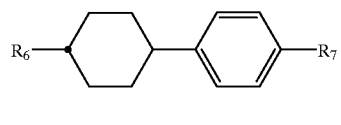

(8-4)

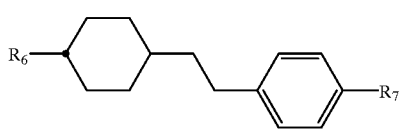

(8-5)

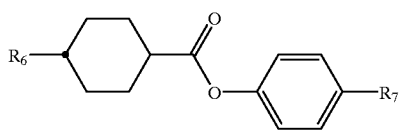

(8-6)

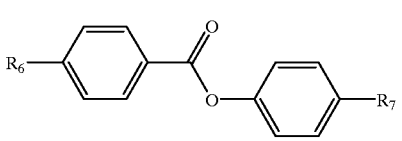

(8-7)

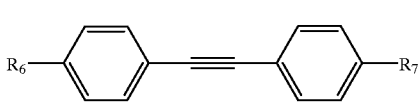

(8-8)
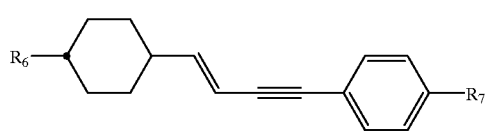

(9-1)
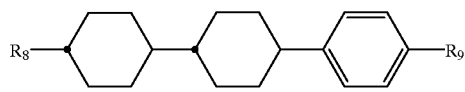

(9-2)
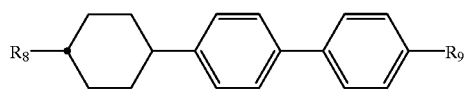

(9-3)
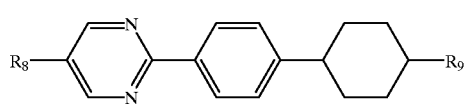

(9-4)
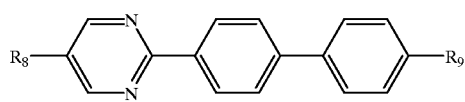

(9-5)
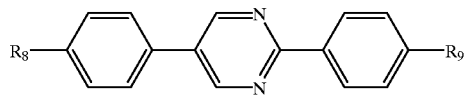

(9-6)
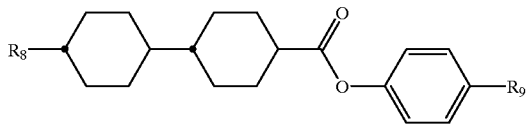

(9-7)
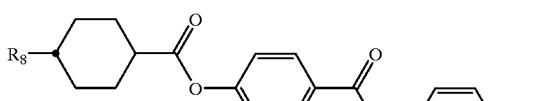

(9-8)
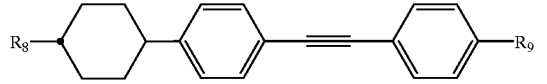

(9-9)
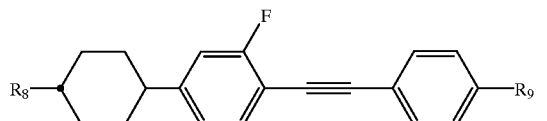

(9-10)
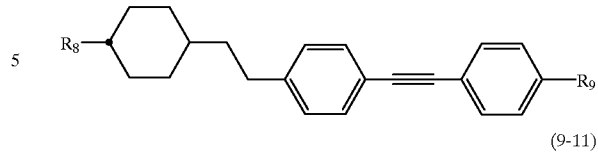

(9-11)
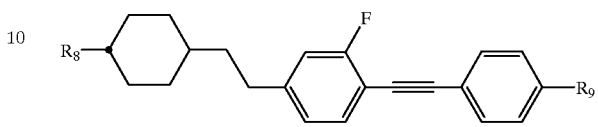

(9-11)
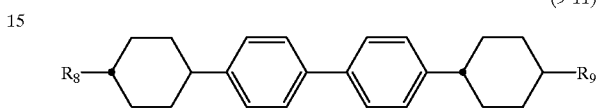

(9-12)
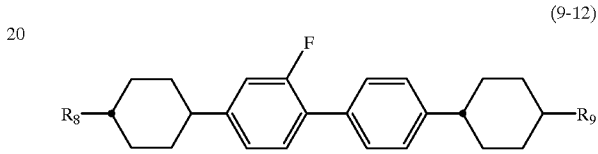

The compounds represented by the formulas (8) to (9) has negative or weakly positive value of dielectric anisotropy. The compound represented by the formulas (8) is used mainly for lowering viscosity and/or adjusting optical anisotropy (Δn). The compound represented by the formulas (9) is used for broadening temperature range of nematic phase such as heightening a clearing point and for adjusting optical anisotropy (Δn).

The compounds represented by the formulas (5) to (9) are essential to prepare a liquid crystal composition for STN display mode or for usual TN display mode.

The amount of the compounds represented by the formula (5) to (9) used for the preparation of a liquid crystal composition for TN display mode or STN display mode is suitably 1 to 99% by weight, preferably 10 to 97% by weight, and more preferably 40 to 95% by weight based on the total weight of the liquid crystal composition. In this case, the liquid crystal composition may also contain additionally the compounds represented by the formula (2) to (4).

The liquid crystal composition of the present invention can be prepared by conventional methods. Generally, they may be prepared by dissolving various components at an elevated temperature. Liquid crystals may be dissolved in an organic solvent and then the solvent is distilled off under reduced pressure to give a liquid crystal composition.

Further, the liquid crystal composition of the present invention may be improved and optimized by the addition of an additive suitable for an intended purpose. Such additives are well known by a person skilled in the art and described in detail in literature. Typically, a chiral dopant is added to induce spiral structure of the liquid crystal so as to adjust a desired degree of twist angle and to avoid reverse twist.

The liquid crystal composition of the present invention can be used for guest-host (GH) mode if a dichroic dye such as merocyanine, styryl, azo, azomethine, azoxy, quinophthalone, anthraquinone and tetrazine dyes is added thereto. Further, the composition of the present invention can be used as a liquid crystal composition for polymer dispersed type liquid crystal display element (PDLCD) represented by NCAP (Nematic Curvilinear Aligned Phases)

which is obtained by microencapsulating nematic liquid crystals, and for polymer network liquid crystal display element (PNLCD) which is obtained by forming a three dimensional polymer network in liquid crystals. In addition, the composition of the present invention can also be used as a liquid crystal composition for electrically controlled birefringence (ECB) mode and dynamic scattering (DS) mode.

The compound represented by the formula (1) can be easily prepared by using usual organic synthetic methods. That is, they can be prepared by combining known reactions which are disclosed in literature and magazines such as New Experimental Chemistry Course, Organic Syntheses, Organic Reactions, etc. For example, the compound can be prepared without problems, according to typical examples given below. In the following formula, $R_1$, $Y_1$, $X_1$, $X_2$, $X_3$, $X_4$, $H_1$, $H_2$, $H_3$, $H_4$, $H_5$, $H_6$, $H_7$ and $H_8$ are the same as defined above, and Hal represents a bromine atom or an iodine atom, and p represents 0 or integer of 1 or more.

According to the method by Suzuki et al (Synth. Commun., 11,513(1981)), a boric acid derivative (10) and a halide (11) are subjected to a cross-coupling reaction in the presence of a catalyst such as palladium or nickel to prepare the compound (1) as a cross-coupling adduct.

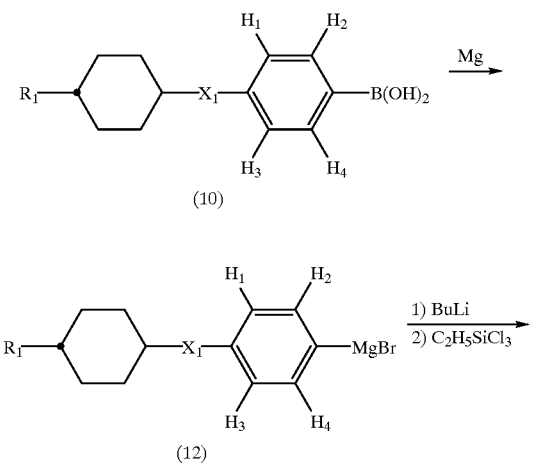

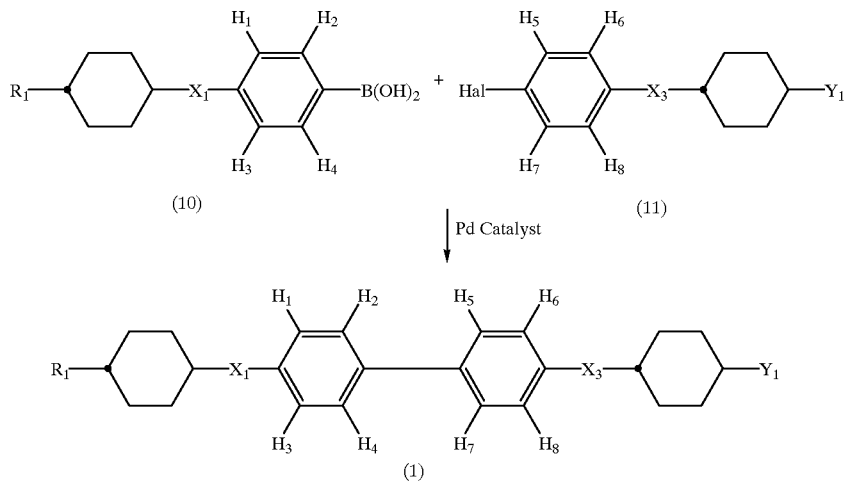

Instead of the compound (10), a Grignard reagent (12) obtained by a common method, a silicon compound (13) obtained by the method of Hatanaka et al (Tetrahedron, 50, 8301 (1994)), and a silicon compound (14) obtained by the method of J.P. Application No. Hei 7-141117 (these intermediate compounds (12) to (14) can be prepared from a compound (15)) are used respectively in the cross-coupling reaction to give the compound (1).

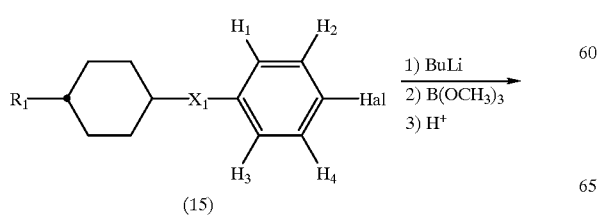

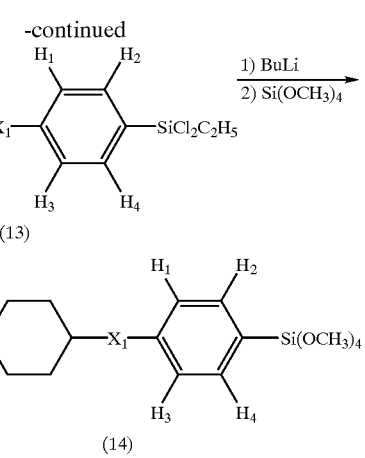

Incidentally, the compounds (10), (12), (13) and (14) can be prepared by subjecting the compound (15) prepared by the method of J.P. KOKAI No. Sho 60-97925, J.P. KOKOKU No. Sho 59-35901 or the like to an appropriate reaction under the condition described in the above literatures. That is, the halide (15) is reacted with alkyl lithium and trialkyl borate in this order and then treated with an acid to obtain the boric acid derivative (10), the halide (15) is reacted with magnesium to obtain the Grignard reagent (12), the halide (15) is treated with alkyl lithium and then reacted with alkyltrichlorosilane to obtain the compound (13), and the halide (15) is treated with alkyl lithium and then reacted with tetraalkoxysilane to obtain the compound (14).

If $Y_1$ is an alkenyl group, $Y_1$ is preferably introduced by the following preparation method. That is, cyclohexanone derivative (16) prepared by the method disclosed in J.P. HOKOKU No. Hei 7-2653 or the like is subjected to increase of carbon atoms and Wittig Reaction to give the compound represented by the formula (1) wherein $Y_1$ is an alkenyl group.

If $Y_1$ is an alkynyl group, $Y_1$ is preferably introduced by the following preparation method. That is, after the aldehyde (17) which is obtained as an intermediate in the above preparation is converted to an acetylene derivative (18) by a conventional method, the compound (18) is alkylated to give the compound represented by the formula (1) wherein $Y_1$ is an alkynyl group.

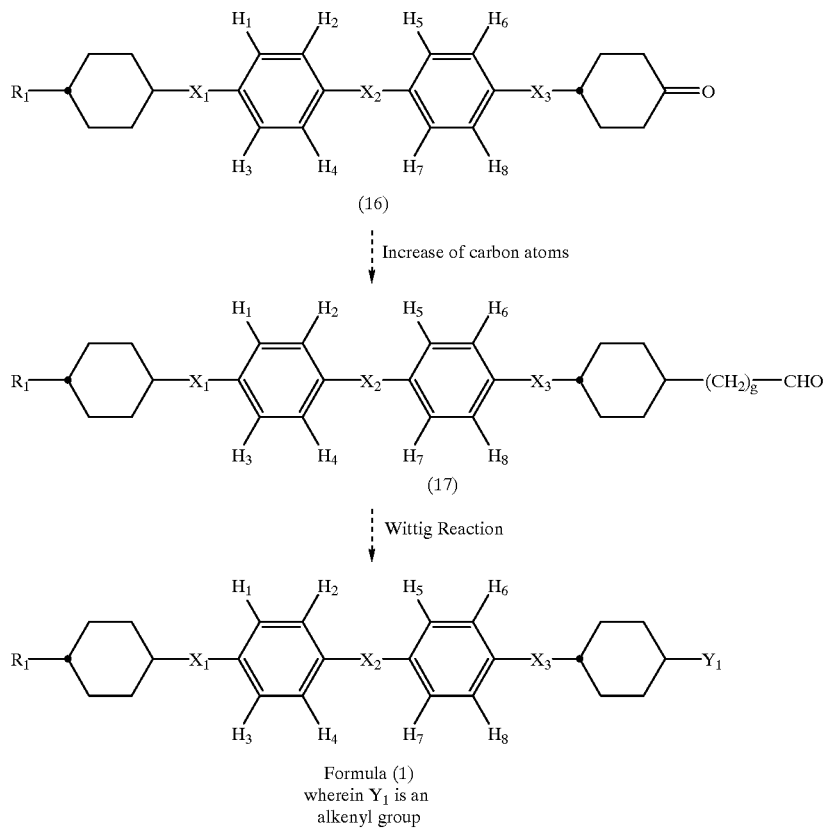

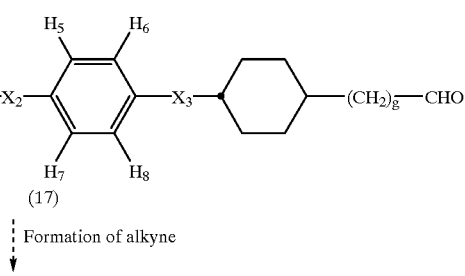

-continued

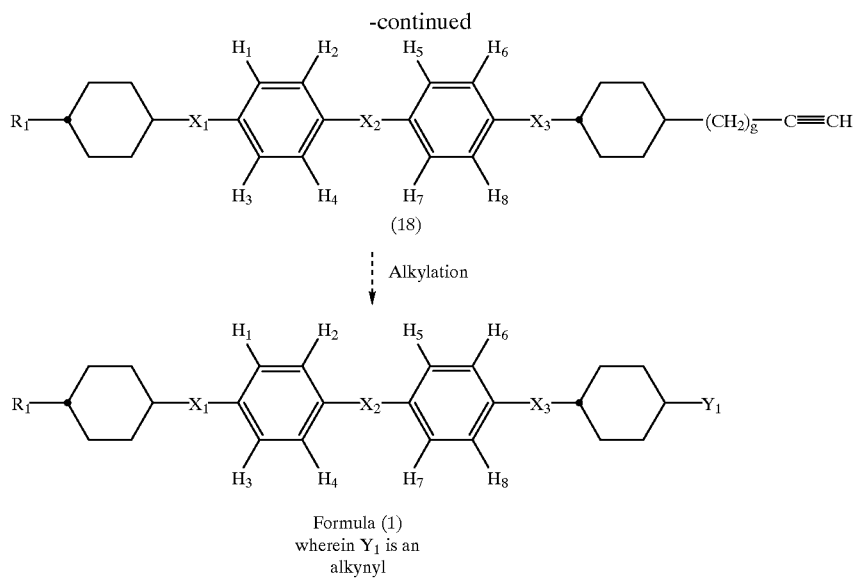

Formula (1)
wherein Y₁ is an alkynyl

EXAMPLES

The following examples explain in detail the method for preparing the compound of the present invention and use examples of the compound. In the examples, C means crystals, N means a nematic phase, S means a smectic phase, I means an isotropic liquid, and the unit of transition temperature is ° C.

Example 1

4-(4-Methoxymethylcyclohexyy)-2'-fluoro-4'(4-propylcyclohexyl)biphenyl (Preparation of compound No. 1-21 represented by the formula (1) wherein $R_1$ is a methoxymethyl group, $X_1$, $X_2$ and $X_3$ are covalent bonds, $Y_1$ is a propyl group, $H_1$, $H_2$, $H_3$, $H_4$, $H_6$, $H_7$ and $H_8$ are hydrogen atoms, and $H_5$ is a fluorine atom)

A solution of butyllithium (0.135 mol) in hexane (80 ml) was dropped to a mixture of 4-(4-methoxymethylcyclohexyl)-1-iodidebenzene (0.135 ml) and THF 90 ml for one hour at temperature range of −60° C. to −65° C. and the mixture formed was stirred for 30 minutes at the same temperature. To this solution was dropped a solution of triisopropyl borate (0.270 mol) in THF (90 ml), and then the mixture formed was warmed up gradually to room temperature, and stirred for one night. After 10% hydrochloric acid solution (50 ml) was added to the solution, the mixture formed was stirred for 30 minutes and then the reacted solution was extracted twice with diethylether and dried over anhydrous magnesium sulfate. The solvent was distilled off and the residue was washed with heptane to give 4-(4-methoxymethylcyclohexyl)phenylboric acid (0.10 mol) which was white solid.

A mixture of 4-(4-methoxymethylcyclohexyy) phenylboric acid (10.5 mmol), 2-fluoro-4-(4-propylcyclohexyl)-1-iodidebenzene (16 mmol), potassium carbonate (21 mmol), 5% palladium carbon (0.1 g), toluene (14 ml), ethanol (14 ml) and water (0.7 ml) was refluxed for 4 hours. After cooling, the reacted solution was washed with water and the organic layer was dried over anhydrous magnesium sulfate.

The solvent was distilled off and the residue was purified by column chromatography (eluant: toluene) and recrystallization (recrystallization solvent: ethanol/ethylacetate=4:3) to give the above-captioned compound (8.5 mmol) which was colorless spicula. Various spectral data thereof supported well the structure of the compound as follows.

1H-NMR: δ(ppm): 7.52–9.92 (m, 7H), 3.35 (s, 3H), 3.25 (d, 2H), 2.50 (brs, 2H), 2.01–0.83 (m, 25H)
GC-MS: 422 (M+)

This compound exhibited liquid crystal properties and phase transition temperatures were as follows:
C-S point: 73.8° C., S-N point: 129.2° C., N-I point: 311.7° C.

Example 2

4-(4-propoxymethylcyclohexyl)-2'-3'-6'-trifluoro-4'-(4-pentylcyclohexyl) biphenyl (Preparation of compound No. 1-33 represented by the formula (1) wherein $R_1$ is a propoxymethyl group, $X_1$, $X_2$ and $X_3$ are covalent bonds, $Y_1$ is a pentyl group, $H_1$, $H_2$, $H_3$, $H_4$ and $H_8$ are hydrogen atoms, $H_5$, $H_6$ and $H_7$ are fluorine atoms)

A solution of butyllithium (0.10 mol) in hexane was dropped in a mixture of 2,3,5-trifluoro-1-bromobenzene (0.10 mol) and THF 100 ml with maintaining a temperature of −78° C. and the mixture formed was stirred for 30 minutes at the same temperature. To this solution was dropped a solution of 4-pentylcyclohexanone (0.11 mol) in THF (50 ml) with maintaining a temperature of −78° C., the mixture formed was warmed up gradually to room temperature with stirring and stirred for 2 hours at room temperature. The reaced product was extracted with ethyl acetate and dried over anhydrous magnesium sulfate.

After the solvent was distilled off, toluene (100 ml) and p-toluenesulfonic acid (5 g) was added to the residue and then the mixture formed was heat-refluxed with dehydration of water formed. After cooling, the organic phase was washed enough with water and then dried over anhydrous magnesium sulfate.

After the solvent was distilled off, ethanol (80 ml) and Raney nickel (3 g) were added to the residue and the mixture was stirred for 12 hours under hydrogen atmosphere. After it was confirmed that absorption of hydrogen was stopped, the catalyst was removed from the reaction system by filtration. The solvent was distilled off to give 1,2,5- trifluoro-4-(4-pentylcyclohexyl)benzene (89 mmol) in the form of oil as residue. This product was a mixture of cis/trans, however it was used in the subsequent reaction without purification.

A solution of butyllithium (89 mmol) in hexane (80 ml) was dropped in a mixture of 1,2,5-trifluoro-4-(4-pentylcyclohexyl)benzene (89 mmol) and THF 90 ml over the period of one hour at −78° C. and the mixture formed was stirred for 30 minutes at the same temperature. To this solution was dropped a solution of triisopropyl borate (180 mmol) in THF (70 ml), the mixture formed was warmed up gradually to room temperature and stirred for one night. After 10% hydrochloric acid (50 ml) was added to the solution, the mixture formed was stirred for 30 minutes and then the reacted solution was extracted twice with diethyl ether and dried over anhydrous magnesium sulfate. The solvent was distilled off and the residue was washed with heptane to give 2,3,6-trifluoro-4-(4-pentylcyclohexyl) phenylboric acid (56 mmol) which was white solid.

A mixture of 2,3,6-trifluoro-4-(4-pentylcyclohexyl) phenylboric acid (20 mmol), 4-(4-methoxymethylcyclohexyl)-1-iodidebenzene (20 mmol), potassium carbonate (40 mmol), 5% palladium carbon (0.2 g), toluene (20 ml), ethanol (20 ml) and water (1.5 ml) was refluxed for 4 hours. After cooling, the reacted solution was washed with water and the organic phase was dried over anhydrous magnesium sulfate.

The solvent was distilled off and the residue was purified by column chromatography (eluant: toluene) and recrystallization (recrystallization solvent: ethanol/ethyl acetate=4:3) to give the above-captioned compound (17 mmol) which was colorless spicula. Various spectral data thereof supported well the structure of the compound.

The following compounds which are represented by formula (1) can be prepared according to Examples 1 and 2. The compounds are given below in addition to the compounds No. 1-21 and No. 1-33.

Compound No./Compound Name

No. 1-1

2-Fluoro-4-(4-methoxymethylcyclohexyl)-4'-(4-ethylcyclohexyl)biphenyl

No. 1-2

2-Fluoro-4-(4-methoxymethylcyclohexyl)-4'-(4-propylcyclohexyl)biphenyl

No. 1-3

2-Fluoro-4-(4-methoxymethylcyclohexyl)-4'-(4-butylcyclohexyl)biphenyl

No. 1-4

2-Fluoro-4-(4-methoxymethylcyclohexyl)-4'-(4-pentylcyclohexyl)biphenyl

No. 1-5

2-Fluoro-4-(4-propoxymethylcyclohexyl)-4'-(4-propylcyclohexyl)biphenyl

No. 1-6

2-Fluoro-4-(4-methoxypropylcyclohexyl)-4'-(4-propylcyclohexyl)biphenyl

No. 1-7

2-Fluoro-4-(4-methoxymethylcyclohexyl)-4'-(4-(3-fluoropropyl)cyclohexyl) biphenyl No. 1-8

3-Fluoro-4-(4-methoxymethylcyclohexyl)-4'-(4-propylcyclohexyl)biphenyl

No. 1-9

3-Fluoro-4-(4-methoxymethylcyclohexyl)-4'-(4-pentylcyclohexyl)biphenyl

No. 1-10

3-Fluoro-4-(4-propoxymethylcyclohexyl)-4'-(4-propylcyclohexyl)biphenyl

No. 1-11

3-Fluoro-4-(4-methoxypropylcyclohexyl)-4'-(4-propylcyclohexyl)biphenyl

No. 1-12

3-Fluoro-4-(4-methoxymethylcyclohexyl)-4'-(4-(3-fluoropropyl)cyclohexyl) biphenyl No. 1-13

2,3-Difluoro-4-(4-methoxymethylcyclohexyl)-4'-(4-propylcyclohexyl) biphenyl

No. 1-14

2,3-Difluoro-4-(4-propoxymethylcyclohexyl)-4'-(4-propylcyclohexyl) biphenyl

No. 1-15

2,3-Difluoro-4-(4-methoxypropylcyclohexyl)-4'-(4-propylcyclohexyl) biphenyl

No. 1-16

2,3-Difluoro-4-(4-methoxymethylcyclohexyl)-4'-(4-(3-fluoropropyl) cyclohexyl)biphenyl No. 1-17

2,5-Difluoro-4-(4-methoxymethylcyclohexyl)-4'-(4-propylcyclohexyl) biphenyl

No. 1-18

2,3-Difluoro-4-(4-methoxymethylcyclohexyl)-4'-(4-(3-fluoropropyl) cyclohexyl)biphenyl No. 1-19

2,6-Difluoro-4-(4-methoxymethylcyclohexyl)-4'-(4-propylcyclohexyl) biphenyl

No. 1-20

3,6-Difluoro-4-(4-methoxymethylcyclohexyl)-4'-(4-(3-fluoropropyl) cyclohexyl)biphenyl No. 1-21

4-(4-Methoxymethylcyclohexyl)-2'-fluoro-4'-(4-propylcyclohexyl)biphenyl C 73.8 S 129.2 N 311.7 I No. 1-22

4-(4-Methoxymethylcyclohexyl)-3'-fluoro-4'-(4-pentylcyclohexyl)biphenyl

No. 1-23

4-(4-Propoxymethylcyclohexyl)-3'-fluoro-4'-(4-pentylcyclohexyl)biphenyl

No. 1-24

4-(4-Methoxymethylcyclohexyl)-2',3'-difluoro-4'-(4-propylcyclohexyl) biphenyl

No. 1-25

4-(4-Methoxypropylcyclohexyl)-2',3'-difluoro-4'-(4-propylcyclohexyl) biphenyl

No. 1-26
4-(4-Methoxymethylcyclohexyl)-2',5'-difluoro-4'-(4-propylcyclohexyl) biphenyl
No. 1-27
4-(4-Methoxypropylcyclohexyl)-2',5'-difluoro-4'-(4-propylcyclohexyl) biphenyl
No. 1-28
4-(4-Methoxymethylcyclohexyl)-2',6'-difluoro-4'-(4-propylcyclohexyl) biphenyl
No. 1-29
4-(4-Methoxypropylcyclohexyl)-2',6'-difluoro-4'-(4-propylcyclohexyl) biphenyl
No. 1-30
4-(4-Methoxymethylcyclohexyl)-3',6'-difluoro-4'-(4-propylcyclohexyl) biphenyl
No. 1-31
4-(4-Methoxypropylcyclohexyl)-3',6'-difluoro-4'-(4-propylcyclohexyl) biphenyl
No. 1-32
4-(4-Methoxymethylcyclohexyl)-3',6'-difluoro-4'-(4-(3-fluoropropyl) cyclohexyl)biphenyl
No. 1-33
4-(4-Propoxymethylcyclohexyl)-2',3',6'-trifluoro-4'-(4-pentylcyclohexyl) biphenyl
No. 1-34
2-Fluoro-4-(4-methoxymethylcyclohexyl)-2'-fluoro-4'-(4-propylcyclohexyl) biphenyl
No. 1-35
2-Fluoro-4-(4-methoxymethylcyclohexyl)-2'-fluoro-4'-(4-pentylcyclohexyl) biphenyl
No. 1-36
2-Fluoro-4-(4-propoxymethylcyclohexyl)-2'-fluoro-4'-(4-propylcyclohexyl) biphenyl
No. 1-37
2-Fluoro-4-(4-methoxypropylcyclohexyl)-2'-fluoro-4'-(4-propylcyclohexyl) biphenyl
No. 1-38
2-Fluoro-4-(4-methoxymethylcyclohexyl)-2'-fluoro-4'-(4-(3-fluoropropyl) cyclohexyl)biphenyl
No. 1-39
2-Fluoro-4-(4-methoxymethylcyclohexyl)-3'-fluoro-4'-(4-propylcyclohexyl) biphenyl
No. 1-40
2-Fluoro-4-(4-methoxymethylcyclohexyl)-3'-fluoro-4'-(4-pentylcyclohexyl) biphenyl
No. 1-41
2-Fluoro-4-(4-propoxymethylcyclohexyl)-3'-fluoro-4'-(4-propylcyclohexyl) biphenyl
No. 1-42
2-Fluoro-4-(4-methoxypropoxycyclohexyl)-3'-fluoro-4'-(4-propylccylohexyl) biphenyl
No. 1-43
2-Fluoro-4-(4-methoxymethylcyclohexyl)-3'-fluoro-4'-(4-(3-fluoropropyl) cyclohexyl)biphenyl
No. 1-44
3-Fluoro-4-(4-methoxymethylcyclohexyl)-3'-fluoro-4'-(4-propylcyclohexyl) biphenyl
No. 1-45
3-Fluoro-4-(4-methoxymethylcyclohexyl)-3'-fluoro-4'-(4-pentylcyclohexyl) biphenyl
No. 1-46
3-Fluoro-4-(4-propoxymethylcyclohexyl)-3'-fluoro-4'-(4-propylcyclohexyl) biphenyl
No. 1-47
3-Fcluoro-4-(4-methoxypropylcyclohexyl)-3'-fluoro-4'-(4-propylcyclohexyl) biphenyl
No. 1-48
3-Fluoro-4-(4-methoxymethylcyclohexyl)-3'-fluoro-4'-(4-(3-fluoropropyl) cyclohexyl)biphenyl No. 2-1
2-Fluoro-4-(2-(4-methoxymethylcyclohexyl)ethyl)-4'-(4-propylcyclohexyl) biphenyl
No. 2-2
2-Fluoro-4-(2-(4-methoxymethylcyclohexyl)ethyl)-4'-(4-pentylcyclohexyl) biphenyl
No. 2-3
2-Fluoro-4-(2-(4-methoxypropylcyclohexyl)ethyl)-4'-(4-propylcyclohexyl) biphenyl
No. 2-4
3-Fluoro-4-(2-(4-methoxymethylcyclohexyl)ethyl)-4'-(4-propylcyclohexyl) biphenyl
No. 2-5
2,3-Difluoro-4-(2-(4-methoxymethylcyclohexyl)ethyl)-4'-(4-propylcyclohexyl) biphenyl
No. 2-6
2,3-Difluoro-4-(2-(4-methoxymethylcyclohexyl)ethyl)-4'-(4-pentylcyclohexyl) biphenyl
No. 2-7
2,5-Difluoro-4-(2-(4-methoxymethylcyclohexyl)ethyl)-4'-(4-propylcyclohexyl) bipheny
No. 2-8
2,6-Difluoro-4-(2-(4-methoxymethylcyclohexyl)ethyl)-4'-(4-propylcyclohexyl) biphenyl
No. 2-9
3,5-Difluoro-4-(2-(4-methoxymethylcyclohexylethyl)-4'-(4-propylcyclohexyl) biphenyl
No. 2-10
4-(2-(4-Methoxymethylcyclohexyl)ethyl)-2'-fluoro-4'-(4-propylcyclohexyl) biphenyl
No. 2-11
4-(2-(4-Methoxymethylcyclohexyl)ethyl)-2'-fluoro-4'-(4-pentylcyclohexyl) biphenyl
No. 2-12
4-(2-(4-Methoxymethylcyclohexyl)ethyl)-3'-fluoro-4'-(4-propylcyclohexyl) biphenyl
No. 2-13
4-(2-(4-Methoxymethylcyclohexyl)ethyl)-3'-fluoro-4'-(4-(3-fluoropropyl) cyclohexyl)biphenyl
No. 2-14
4-(2-(4-Methoxymethylcyclohexyl)ethyl)-2',3'-difluoro-4'-(4-propylcyclo hexyl) biphenyl
No. 2-15
4-(2-(4-Methoxymethylcyclohexyl)ethyl)-2',5'-difluoro-4'-(4-propylcyclo hexyl) biphenyl
No. 2-16
4-(2-(4-Methoxymethylcyclohexyl)ethyl)ethyl)-2',6'-difluoro-4'-(4-propyl cyclohexyl) biphenyl
No. 2-17
2-Fluoro-4-(2-(4-methoxymethylcyclohexyl)ethyl)-2'-fluoro-4'-(4-pentyl cyclohexyl) biphenyl
No. 2-18
2-Fluoro-4-(2-(4-methoxypropylcyclohexyl)ethyl)-2'-fluoro-4'-(4-propyl cyclohexyl) biphenyl
No. 2-19
2-Fluoro-4-(2-(4-methoxymethylcyclohexyl)ethyl)-3'-fluoro-4'-(4-pentyl cyclohexyl) biphenyl
No. 2-20
2-Fluoro-4-(2-(4-methoxypropylcyclohexyl)ethyl)-3'-fluoro-4'-(4-propyl cyclohexyl) biphenyl
No. 2-21
3-Fluoro-4-(2-(4-methoxymethylcyclohexyl)ethyl)-2'-fluoro-4'-(4-pentyl cyclohexyl) biphenyl
No. 2-22
3-Fluoro-4-(2-(4-methoxypropylcyclohexyl)ethyl)-2'-fluoro-4'-(4-propyl cyclohexyl) biphenyl No. 3-1
4-(2-(2-Fluoro-4-(4-methoxymethylcyclohexyl)phenyl)ethyl)-1-(4-(4-propyl cyclohexyl)benzene
No. 3-2
4-(2-(3-Fluoro-4-(4-methoxymethylcyclohexyl)phenyl)ethyl)-1-(4-(4-propyl cyclohexyl)benzene
No. 3-4
4-(2-(4-(4-Methoxymethylcyclohexyl)phenyl)ethyl)-1-(4-(4-propylcyclohexyl)-3-fluorobenzene
No. 4-1
2-Fluoro-4-(4-methoxymethylcyclohexyl)-4'-(2-(4-propylcyclohexyl)ethyl) biphenyl
No. 4-2
2-Fluoro-4-(4-ethoxymethylcyclohexyl)-4'-(2-(4-propylcyclohexyl)ethyl) biphenyl
No. 4-3
2-Fluoro-4-(4-butoxymethylcyclohexyl)-4'-(2-(4-propylcyclohexyl)ethyl) biphenyl
No. 4-4
3-Fluoro-4-(4-methoxymethylcyclohexyl)-4'-(2-(4-propylcyclohexyl)ethyl) biphenyl
No. 4-5
2,3-Difluoro-4-(4-methoxymethylcyclohexyl)-4'-(2-(4-propylcyclohexyl) ethyl)biphenyl
No. 4-6
2,3-Difluoro-4-(4-methoxymethylcyclohexyl)-4'-(2-(4-pentylcyclohexyl) ethyl)biphenyl
No. 4-7
2,5-Difluoro-4-(4-methoxymethylcyclohexyl)-4'-(2-(4-propylcyclohexyl) ethyl)biphenyl
No. 4-8
2,6-Difluoro-4-(4-methoxymethylcyclohexyl)-4'-(2-(4-propylcyclohexyl) ethyl)biphenyl
No. 4-9
4-(4-Methoxymethylcyclohexyl)-2'-fluoro-4'-(2-(4-propylcyclohexyl) ethyl)biphenyl C 114.2 N 235.6 I
No. 4-10
4-(4-Ethoxymethylcyclohexyl)-3'-fluoro-4'-(2-(4-propylcyclohexyl)ethyl) biphenyl
No. 4-11
4-(4-Butoxymethylcyclohexyl)-3'-Fluoro-4'-(2-(4-propylcyclohexyl)ethyl) biphenyl
No. 4-12
4-(4-Methoxymethylcyclohexyl)-2',3'-difluoro-4'-(2-(4-propylcyclohexyl) ethyl)biphenyl
No. 4-13
4-(4-Ethoxymethylcyclohexyl)-2',5'-difluoro-4'-(2-(4-propylcyclohexyl) ethyl)biphenyl
No. 4-14
4-(4-Butoxymethylcyclohexyl)-3',6'-difluoro-4'-(2-(4-propylcyclohexyl) ethyl)biphenyl
No. 5-1
2-Fluoro-4-(4-(4-methoxymethylcyclohexyl)butyl)-4'-(4-propylcyclohexyl) biphenyl
No. 5-2
2-Fluoro-4-(4-(4-methoxymethylcyclohexyl)butyl)-4'-(4-pentylcyclohexyl) biphenyl
No. 5-3
2-Fluoro-4-(4-(4-methoxypropylcyclohexyl)butyl)-4'-(4-propylcyclohexyl) biphenyl
No. 5-4
3-Fluoro-4-(4-(4-methoxymethylcyclohexyl)butyl)-4'-(4-propylcyclohexyl) biphenyl
No. 5-5
2,3-Difluoro-4-(4-(4-methoxymethylcyclohexyl)butyl)-4'-(4-propylcyclohexyl) biphenyl
No. 5-6
2,3-Difluoro-4-(4-(4-methoxymethylcyclohexyl)butyl)-4'-(4-pentylcyclohexyl) biphenyl
No. 5-7
2,5-Difluoro-4-(4-(4-methoxymethylcyclohexyl)butyl)-4'-(4-propylcyclohexyl) biphenyl
No. 5-8
2,6-Difluoro-4-(4-(4-methoxymethylcyclohexyl)butyl)-4'-(4-propylcyclohexyl) biphenyl
No. 5-9
3,5-Difluoro-4-(4-(4-methoxymethylcyclohexyl)butyl)-4'-(4-propylcyclohexyl) biphenyl
No. 5-10
4-(4-(4-Methoxymethylcyclohexyl)butyl)-2'-fluoro-4'-(4-propylcyclohexyl) biphenyl
No. 5-11
4-(4-(4-Methoxymethylcyclohexyl)butyl)-3'-fluoro-4'-(4-propylcyclohexyl) biphenyl
No. 5-12
4-(4-(4-Methoxymethylcyclohexyl)butyl)-3'-fluoro-4'-(4-(3-fluoropropyl) cyclohexyl)biphenyl
No. 5-13
4-(4-(4-Methoxymethylcyclohexyl)butyl)-2',3'-difluoro-4'-(4-propyl cyclohexyl)biphenyl
No. 5-14
4-(4-(4-Methoxymethylcyclohexyl)butyl)-2',5'-difluoro-4'-(4-propyl cyclohexyl)biphenyl
No. 5-15
4-(4-(4-Methoxymethylcyclohexyl)butyl)-2',6'-difluoro-4'-(4-propyl cyclohexyl)biphenyl
No. 5-16
2-Fluoro-4-(4-(4-methoxymethylcyclohexyl)butyl)-2'-fluoro-4'-(4-pentyl cyclohexyl)biphenyl
No. 5-17
2-Fluoro-4-(4-(4-methoxypropylcyclohexyl)butyl)-2'-fluoro-4'-(4-propyl cyclohexyl)biphenyl
No. 5-18
2-Fluoro-4-(4-(4-methoxypropylcyclohexyl)butyl)-3'-fluoro-4'-(4-pentyl cyclohexyl)biphenyl
No. 5-19
2-Fluoro-4-(4-(4-methoxypropylcyclohexyl)butyl)-3'-fluoro-4'-(4-propyl cyclohexyl)biphenyl
No. 5-20
3-Fluoro-4-(4-(4-methoxymethylcyclohexyl)butyl))-2'-fluoro-4'-(4-pentyl cyclohexyl)biphenyl
No. 5-21
3-Fluoro-4-(4-(4-methoxypropylcyclohexyl)butyl)-2'-fluoro-4'-(4-propyl cyclohexyl)biphenyl
No. 6-1
4-(4-(2-Fluoro-4-(4-methoxymethylcyclohexyl)phenyl)butyl)-1-(4-(4-propylcyclohexyl)benzene
No. 6-2
4-(4-(3-Fluoro-4-(4-methoxymethylcyclohexyl)phenyl)butyl)-1-(4-(4-propylcyclohexyl)benzene
No. 6-3
4-(4-(4-(4-Methoxymethylcyclohexyl)phenyl)butyl)-1-(4-(4-propylcyclohexyl)-2-fluorobenzene
No. 6-4
4-(4-(4-(4-Methoxymethylcyclohexyl)phenyl)butyl)-1-(4-(4-propylcyclohexyl)-3-fluorobenzene
No. 7-1
2-Fluoro-4-(4-methoxymethylcyclohexyl)-4'-(4-(4-propylcyclohexyl)butyl) biphenyl
No. 7-2
2-Fluoro-4-(4-ethoxymethylcyclohexyl)-4'-(4-(4-propylcyclohexyl)butyl) biphenyl
No. 7-3
2-Fluoro-4-(4-butoxymethylcyclohexyl)-4'-(4-(4-propylcyclohexyl)butyl) biphenyl No. 7-4
3-Fluoro-4-(4-methoxymethylcyclohexyl)-4'-(4-(4-propylcyclohexyl)butyl) biphenyl
No. 7-5
2,3-Difluoro-4-.(4-methoxymethylcyclohexyl)-4'-(4-(4-propylcyclohexyl) butyl)biphenyl
No. 7-6
2,3-Difluoro-4-(4-methoxymethylcyclohexyl)-4'-(4-(4-pentylcyclohexyl) butyl)biphenyl
No. 7-7
2,5-Difluoro-4-(4-methoxymethylcyclohexyl)-4'-(4-(4-propylcyclohexyl) butyl)biphenyl
No. 7-8
2,6-Difluoro-4-(4-methoxymethylcyclohexyl)-4'-(4-(4-propylcyclohexyl) butyl)biphenyl
No. 7-9
4-(4-Methoxymethylcyclohexyl)-2'-fluoro-4'-(4-(4-propylcyclohexyl)butyl) biphenyl
No. 7-10
4-(4-Ethoxymethylcyclohexyl)-3'-fluoro-4'-(4-(4-propylcyclohexyl)butyl) biphenyl
No. 7-11
4-(4-Butoxymethylcyclohexyl)-3'-fluoro-4'-(4-(4-propylcyclohexyl)butyl) biphenyl
No. 7-12
4-(4-Methoxymethylcyclohexyl)-2',3'-difluoro-4'-(4-(4-propylcyclohexyl) butyl)biphenyl
No. 7-13
4-(4-Ethoxymethylcyclohexyl)-2',5'-difluoro-4'-(4-(4-propylcyclohexyl) butyl)biphenyl
No. 7-14
4-(4-Butoxymethylcyclohexyl)-3',6'-difluoro-4'-(4-(4-propylcyclohexyl) butyl)biphenyl
No. 8-1
2-Fluoro-4-(2-(4-methoxymethylcyclohexyl)ethyl)-4'-(2-(4-propylcyclohexyl) ethyl)biphenyl
No. 8-2
2-Fluoro-4-(2-(4-methoxypropylcyclohexyl)ethyl)-4'-(2-(4-propylcyclohexyl) ethyl)biphenyl
No. 8-3
3-Fluoro-4-(2-(4-methoxymethylcyclohexyl)ethyl)-4'-(2-(4-propylcyclohexyl) ethyl)biphenyl
No. 8-4
3-Fluoro-4-(2-(4-methoxymethylcyclohexyl)ethyl)-4'-(2-(4-pentylcyclohexyl) ethyl)biphenyl
No. 8-5
2,3-Difluoro-4-(2-(4-methoxymethylcyclohexyl)ethyl)-4'-(2-(4-propylcyclo hexyl)ethyl)biphenyl
No. 8-6
2,5-Difluoro-4-(2-(4-methoxymethylcyclohexyl)ethyl)-4'-(2-(4-propylcyclo hexyl)ethyl)biphenyl
No. 8-7
2,6-Difluoro-4-(2-(4-methoxymethylcyclohexyl)ethyl)-4'-(2-(4-propylcyclo hexyl)ethyl)biphenyl
No. 8-8
4-(2-(4-Methoxymethylcyclohexyl)ethyl)-2'-fluoro-4'-(2-(4-propylcyclohexyl) ethyl)biphenyl
No. 8-9
4-(2-(4-Methoxymethylcyclohexyl)ethyl)-2'-fluoro-4'-(2-(4-butylcyclohexyl) ethyl)biphenyl
No. 8-10
4-(2-(4-Methoxymethylcyclohexyl)ethyl)-2'-fluoro-4'-(2-(4-pentylcyclohexyl) ethyl)biphenyl
No. 8-11
4-(2-(4-Methoxymethylcyclohexyl)ethyl)-3'-fluoro-4'-(2-(4-propylcyclo hexyl)ethyl)biphenyl
No. 8-12
4-(2-(4-Methoxymethylcyclohexyl)ethyl)-2',3'-difluoro-4'-(2-(4-propyl cyclohexyl)ethyl)biphenyl
No. 8-13
4-(2-(4-Methoxymethylcyclohexyl)ethyl)-2',5'-difluoro-4'-(2-(4-propyl cyclohexyl)ethyl)biphenyl
No. 8-14
4-(2-(4-Methoxymethylcyclohexyl)ethyl)-2',6'-difluoro-4'-(2-(4-propyl cyclohexyl)ethyl)biphenyl Example 4 (Use Example 1)

A liquid crystal composition B1 consisting of 4-(4-propylcyclohexyl)benzonitrile (24%), 4-(4-pentylcyclohexyl)benzonitrile (36%), 4-(4-heptylcyclohexyl) benzonitrile (25%) and 4-(4-pentylcyclohexyl)-4'-cyanobiphenyl (15%) was prepared. The liquid crystal composition B1 had 71.7° C. of clearing point, 11.0 of dielectric anisotropy, 0.137 of optical anisotropy, 26.7 mPas of viscosity at 20° C. and 1.78 V of threshold voltage at cell thickness of 8.7 μm.

To 85% by weight of B1 was added 15% by weight of 4-(4-methoxymethylcyclohexyl)-2'-fluoro-4'-(4-propylcyclohexyl)biphenyl (compound No. 1-21) obtained by Example 1 according to the present invention to prepare a liquid crystal composition A1. The liquid crystal composition A1 had 92.8° C. of clearing point (extrapolation value: 212.4° C.), 10.0 of dielectric anisotropy (extrapolation value: 4.2), 0.143 of optical anisotropy (extrapolation value: 0.175), 33.4 mPas of viscosity at 20° C. (extrapolation value: 71.3 mPas) and 1.92 V of threshold voltage at cell thickness of 8.7 μm. The composition A1 was allowed to stand in a freezer at −20° C. for 60 days but crystal separation was not observed. Voltage holding ratio of the composition A1 was 99.8% at 100° C.

A nematic liquid crystal composition comprising a compound represented by the formula (1) according to the present invention is further exemplified in the following Composition Examples 1 to 32. In the Examples, the components are expressed according to the regulated notation shown in the following table.

| Left-terminal Group | Symbol | Bonding Group | Symbol |
|---|---|---|---|
| $C_nH_{2n+1}$— | n— | | |
| $C_nH_{2n+1}O$— | nO— | —$CH_2CH_2$— | 4 |
| $C_nH_{2n+1}OC_mH_{2m}$— | nOm— | —$(CH_2)_4$— | 2 |
| $CH_2$=CH— | V— | —COO— | E |
| $CH_2$=$CHC_nH_{2n}$— | Vn— | —C≡C— | T |
| $C_nH_{2n+1}CH$=CH— | nV— | —CH=CH— | V |
| $C_nH_{2n+1}CH$=$CHC_mH_{2m}$— | nVm— | —$CF_2O$— | CF2O |
| $C_nH_{2n+1}CH$=$CHC_mH_{2m}CH$= | nVmVk— | | |
| $CHC_kH_{2k}$— | | | |

| Ring Structure | Symbol | Right-terminal Group | Symbol |
|---|---|---|---|
| 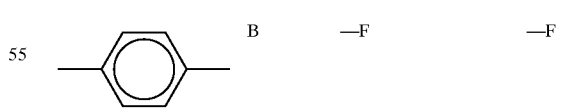 | B | —F | —F |
| | | —Cl | —CL |
|  | B(2F, 3F) | —CN | —C |
| | | —$CF_3$ | —CF3 |

-continued

| | | | |
|---|---|---|---|
| 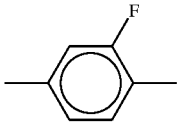 | B(F) | —OCF₃ | —OCF3 |
| | | —OCF₂H | —OCF2H |

| Structure of Groups | Symbol |
|---|---|
| C₃H₇— | 3- |
| CH₃OCH₂— | 101- |
| CH₂=CH— | V- |
| CH₃CH=CHCH₂CH₂— | 1V2- |

| Structure of Compounds | Symbol |
|---|---|
| (C₃H₇–cyclohexyl–CH₂CH₂–cyclohexyl–phenyl(F,F,F)) | 3-H2HB(F, F)—F |
| (CH₃OCH₂–cyclohexyl–phenyl–phenyl(2F,3F)–cyclohexyl–C₃H₇) | 101-HBB(2F, 3F)H-3 |

-continued

| | | | |
|---|---|---|---|
| (B(F,F) phenyl with 3F,5F) | B(F, F) | —CₙH₂ₙ₊₁ | —n |
| | | —OCₙH₂ₙ₊₁ | —On |
| | | —COOCH₃ | —EMe |
| (cyclohexyl) | H | —CH=CF₂ | —VFF |
| | | —C≡C—CN | —TC |
| (pyrimidine) | Py | —(CH₂)ₙCH=CF₂ | —nVFF |
| | | —(CH₂)ₙCH=CH₂ | —nV |
| (dioxane) | D | —(CH₂)ₙCH=CHCₘH₂ₘ₊₁ | —nVm |

In the above table, n, m and k represent independently an integer of 1 or more.

Examples of the notation are shown below, using some groups and structures of compounds

| Composition Example 1 | |
|---|---|
| 1O1-HBB(2F)H-3 (compound No. 1–21) | 7.0% |
| 1O1-HBB(2F)2H-3 (compound No. 4–9) | 7.0% |
| 7-HB(F, F)—F | 4.0% |
| 3-H2HB(F, F)—F | 10.0% |
| 4-H2HB(F, F)—F | 10.0% |
| 3-HHB(F, F)—F | 10.0% |
| 4-HHB(F, F)—F | 10.0% |
| 3-HH2B(F, F)—F | 10.0% |
| 5-HH2B(F, F)—F | 10.0% |
| 3-HBB(F, F)—F | 12.0% |
| 5-HBB(F, F)—F | 6.0% |
| 3-HHBB(F, F)—F | 2.0% |
| 2-HH2BB(F, F)—F | 2.0% |
| Composition Example 2 | |
| 1O1-HBB(2F)H-3 (compound No. 1–21) | 5.0% |
| 1O1-HBB(2F)2H-3 (compound No. 4–9) | 5.0% |
| 1O1-HBB(2F, 6F)H-3 (compound No. 1–28) | 5.0% |
| 7-HB(F)—F | 8.0% |
| 2-HHB(F)—F | 10.0% |
| 3-HHB(F)—F | 10.0% |
| 5-HHB(F)—F | 10.0% |
| 2-H2HB(F)—F | 6.0% |
| 3-H2HB(F)—F | 3.0% |
| 5-H2HB(F)—F | 6.0% |
| 2-HBB(F)—F | 8.0% |
| 3-HBB(F)—F | 8.0% |
| 5-HBB(F)—F | 16.0% |

Composition Example 3

| | |
|---|---|
| 1O1-HBB(2F)2H-3 (compound No. 1–21) | 5.0% |
| 1O1-HBB(2F, 3F)H-3 (compound No. 1–24) | 5.0% |
| 5-H2B(F)—F | 7.0% |
| 2-HHB(F)—F | 13.0% |
| 3-HHB(F)—F | 13.0% |
| 5-HHB(F)—F | 13.0% |
| 2-H2HB(F)—F | 4.0% |
| 3-H2HB(F)—F | 2.0% |
| 5-H2HB(F)—F | 4.0% |
| 3-H2HB(F, F)—F | 6.0% |
| 5-H2HB(F, F)—F | 5.0% |
| 3-HHB(F, F)—F | 8.0% |
| 3-HH2B(F, F)—F | 8.0% |
| 5-HH2B(F, F)—F | 7.0% |

Composition Example 4

| | |
|---|---|
| 1O1-HBB(2F, 6F)H-3 (compound No. 1–28) | 6.0% |
| 3O1-HB(F)BH-3 (compound No. 1–5) | 7.0% |
| 5-HB—CL | 7.0% |
| 7-HB(F, F)—F | 5.0% |
| 2-HBB(F)—F | 7.0% |
| 3-HBB(F)—F | 7.0% |
| 5-HBB(F)—F | 14.0% |
| 2-HHB—CL | 5.0% |
| 4-HHB—CL | 10.0% |
| 5-HHB—CL | 5.0% |
| 3-HBB(F, F)—F | 10.0% |
| 3-HB(F)VB-2 | 5.0% |
| 3-HB(F)VB-3 | 5.0% |
| 3-HHEBB-F | 2.0% |
| 3-H2BB(F, F)—F | 5.0% |

Composition Example 5

| | |
|---|---|
| 3O1-HB(F)BH-3 (compound No. 1–5) | 6.0% |
| 1O1-HB(F)B(2F)H-3 (compound No. 1–34) | 4.0% |
| 7-HB(F)—F | 4.0% |
| 2-HHB(F)—F | 10.0% |
| 3-HHB(F)—F | 10.0% |
| 5-HHB(F)—F | 10.0% |
| 2-H2HB(F)—F | 6.0% |
| 3-H2HB(F)—F | 3.0% |
| 5-H2HB(F)—F | 6.0% |
| 2-HBB(F)—F | 3.0% |
| 3-HBB(F)—F | 3.0% |
| 5-HBB(F)—F | 6.0% |
| 2-HBB—F | 4.0% |
| 3-HHB—F | 4.0% |
| 3-HB-O2 | 6.0% |
| 3-HHB-1 | 5.0% |
| 1O1-HBBH-3 | 2.0% |
| 3-HHEB(F, F)—F | 5.0% |
| 3-HBEB(F, F)—F | 3.0% |

Composition Example 6

| | |
|---|---|
| 1O1-HBB(2F)H-3 (compound No. 1–21) | 5.0% |
| 1O1-HBB(2F)2H-3 (compound No. 4–9) | 5.0% |
| V2-HB—C | 10.0% |
| 1V2-HB—C | 10.0% |
| 3-HB—C | 15.0% |
| 5-HB—C | 5.0% |
| 1O1-HB—C | 3.0% |
| 2-HHB—C | 3.0% |
| 3-HHB—C | 4.0% |
| 4-HHB—C | 3.0% |
| 3-HH-4 | 10.0% |
| 1O1-HH-5 | 8.0% |
| 2-BTB-O1 | 10.0% |
| 3-HHB-1 | 2.0% |
| 3-HB(F)TB-2 | 3.0% |
| 3-HB(F)TB-3 | 3.0% |

Composition Example 7

| | |
|---|---|
| 1O1-HB(2F, 3F)B4H-5 (compound No. 7–6) | 5.0% |
| 3-HB(F)—C | 10.0% |
| 5-HB(F)—C | 5.0% |
| 2-BEB—C | 7.0% |
| 2-HHB(F)—C | 7.0% |
| 3-HHB(F)—C | 7.0% |
| 2-BTB-1 | 8.0% |
| 3-HH-4 | 10.0% |
| 3-HHB-1 | 7.0% |
| 5-PyB(F)—F | 10.0% |
| 3-PyBB—F | 5.0% |
| 4-PyBB—F | 5.0% |
| 7-HEB—F | 4.0% |
| 3-HHEB—F | 4.0% |
| 3-HBEB—F | 4.0% |
| 3-HEBEB—F | 2.0% |

Composition Example 8

| | |
|---|---|
| 1O1-HBB(2F)H-3 (compound No. 1–21) | 5.0% |
| 1O1-HBB(2F)2H-3 (compound No. 4–9) | 4.0% |
| 1O1-HBB(2F, 3F)H-3 (compound No. 1–24) | 3.0% |
| 1O1-HBB(2F, 6F)H-3 (compound No. 1–28) | 3.0% |
| 3-DB—C | 5.0% |
| 3-HB—C | 10.0% |
| 2-BB—C | 5.0% |
| 4-PyB-O6 | 5.0% |
| 3-PyB-4 | 5.0% |
| 3-HHB-1 | 10.0% |
| 3-HHB-O1 | 6.0% |
| 6-PyBB-2 | 4.0% |
| 3-PyBH-2 | 5.0% |
| 5-PyB—F | 3.0% |
| 3-HHB—F | 2.0% |
| 3-HEB-O4 | 5.0% |
| 4-HEB-O2 | 6.0% |
| 5-HEB-O1 | 6.0% |
| 4-HEB-2 | 4.0% |
| 1O-BEB-2 | 4.0% |

Composition Example 9

| | |
|---|---|
| 1O1-HBB(2F)2H-3 (compound No. 4–9) | 6.0% |
| 1V2-BEB(F, F)—C | 10.0% |
| 3O1-BEB(F)—C | 12.0% |
| 2-HB—C | 12.0% |
| 3-HB—C | 10.0% |
| 2-HHB—C | 4.0% |
| 3-HHB—C | 5.0% |
| 4-HHB—C | 4.0% |
| 5-HHB—C | 4.0% |
| 3-HB—O2 | 7.0% |
| 3-HHB-1 | 7.0% |
| 3-HHB—O1 | 4.0% |
| 3-H2BTB-2 | 4.0% |
| 3-H2BTB-3 | 4.0% |
| 3-H2BTB-4 | 4.0% |
| 3-HEBEB-1 | 3.0% |

Composition Example 10

| | |
|---|---|
| 1O1-HBB(2F, 3F)H-3 (compound No. 1–24) | 4.0% |
| 1O1-HBB(2F, 6F)H-3 (compound No. 1–28) | 6.0% |
| V2-HB—C | 12.0% |
| 1V2-HB—C | 10.0% |
| 1V2-BEB(F, F)—C | 10.0% |
| 2-BTB-1 | 8.0% |
| 4-BTB—O2 | 8.0% |
| 5-BTB—O1 | 6.0% |
| 3-HH-4 | 3.0% |
| 3-HH-EMe | 3.0% |

| | |
|---|---|
| 3-H2BTB-2 | 4.0% |
| 3-H2BTB-3 | 4.0% |
| 3-H2BTB-4 | 4.0% |
| 3-HB(F)TB-2 | 4.0% |
| 3-HB(F)TB-3 | 4.0% |
| 3-HB(F)TB-4 | 6.0% |
| 3-HBEBB—C | 2.0% |
| 3-HHEBB—C | 2.0% |
| Composition Example 11 | |
| | |
| 3O1-HB(F)BH-3 | 5.0% |
| (compound No. 1–5) | |
| 1O1-HB(2F, 3F)B4H-5 | 5.0% |
| (compound No. 7–6) | |
| 5-HB—F | 6.0% |
| 3-HH—O1 | 5.0% |
| 3-HH—O3 | 5.0% |
| 5-HH—O1 | 5.0% |
| 3-HHB—OCHF2 | 3.0% |
| 5-HHB—OCHF2 | 3.0% |
| 3-HHB(F, F)—OCHF2 | 8.0% |
| 5-HHB(F, F)—OCHF2 | 8.0% |
| 2-HHB—OCF3 | 6.0% |
| 3-HHB—OCF3 | 7.0% |
| 4-HHB—OCF3 | 6.0% |
| 5-HHB—OCF3 | 6.0% |
| 3-HH2B(F)—F | 7.0% |
| 5-HH2B(F)—F | 9.0% |
| 3-HHEB(F)—F | 6.0% |
| Composition Example 12 | |
| | |
| 1O1-HBB(2F)H-3 | 6.0% |
| (compound No. 1–21) | |
| 1O1-HBB(2F, 3F)H-3 | 4.0% |
| (compound No. 1–24) | |
| 5-HB—F | 4.0% |
| 7-HB—F | 7.0% |
| 3-HHB—OCF3 | 10.0% |
| 5-HHB—OCF3 | 8.0% |
| 3-H2HB—OCF3 | 5.0% |
| 5-H2HB—OCF3 | 5.0% |
| 2-HHB(F)—F | 4.0% |
| 3-HHB(F)—F | 4.0% |
| 5-HHB(F)—F | 4.0% |
| 5-H2BB(F)—F | 6.0% |
| 3-H2HB(F, F)—F | 5.0% |
| 5-H2HB(F, F)—F | 5.0% |
| 3-HHB(F, F)—F | 8.0% |
| 3-HH2B(F, F)—F | 8.0% |
| 4-HH2B(F, F)—F | 7.0% |
| Composition Example 13 | |
| | |
| 3O1-HB(F)BH-3 | 5.0% |
| (compound No. 1–5) | |
| 1O1-HB(F)B(2F)H-3 | 5.0% |
| (compound No. 1–34) | |
| V-HB—C | 10.0% |
| 1V-HB—C | |
| 3-BB—C | 5.0% |
| 5-BB—C | 5.0% |
| 2-HB(F)—C | 5.0% |
| 4-BB-3 | 3.0% |
| 3-H2B—O2 | 5.0% |
| 5-H2B—O2 | 6.0% |
| 3-BEB—C | 5.0% |
| 5-HEB—O1 | 8.0% |
| 5-HEB—O3 | 8.0% |
| 5-BBB—C | 3.0% |
| 4-BPyB—C | 4.0% |
| 4-BPyB-5 | 4.0% |
| 5-HB2B-4 | 3.0% |
| 5-HBB2B-3 | 3.0% |
| 1V-HH-1O1 | 5.0% |
| 1V2-HBB-3 | 3.0% |
| Composition Example 14 | |
| | |
| 1O1-HBB(2F)2H-3 | 6.0% |
| (compound No. 4–9) | |
| 1O1-HBB(2F, 6F)H-3 | 4.0% |

| | |
|---|---|
| (compound No. 1–28) | |
| V2-HB—C | 9.0% |
| 1V2-HB—C | 9.0% |
| 3-HB—C | 14.0% |
| 1O1-HB—C | 8.0% |
| 2O1-HB—C | 4.0% |
| 2-HHB—C | 5.0% |
| 3-HHB—C | 5.0% |
| V2-HH-3 | 10.0% |
| 1O1-HH-5 | 5.0% |
| 2-BTB-O1 | 7.0% |
| V—HHB-1 | 5.0% |
| V—HBB-2 | 5.0% |
| 1V2-HBB-2 | 4.0% |
| Composition Example 15 | |
| | |
| 1O1-HBB(2F)H3 | 7.0% |
| (compound No. 1–21) | |
| 1V2-BEB(F, F)—C | 5.0% |
| 3-HB—C | 28.0% |
| 1-BTB-3 | 5.0% |
| 2-BTB-1 | 10.0% |
| 3-HH-4 | 8.0% |
| 3-HHB-1 | 11.0% |
| 3-HHB-3 | 9.0% |
| 3-H2BTB-2 | 4.0% |
| 3-H2BTB-3 | 4.0% |
| 3-H2BTB-4 | 4.0% |
| 3-HB(F)TB-2 | 5.0% |

Physical properties of this liquid crystal composition were as follows:

$T_{NI}$=98.8 (° C.)

$\eta$=18.2 (mPa·s)

$\Delta n$=0.163

$\Delta \epsilon$=7.7

$V_{TH}$=2.06 (V)

When 0.8 parts by weight of CM-33 was added to 100 parts by weight of the above composition, pitch (P) was found to be 11.1 $\mu$m.

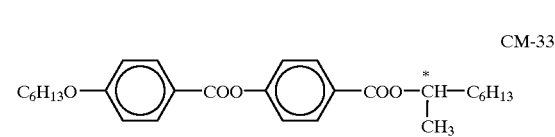

CM-33

| | |
|---|---|
| Composition Example 16 | |
| | |
| 1O1-HBB(2F)H-3 | 8.0% |
| (compound No. 1–21) | |
| 2O1-BEB(F)—C | 5.0% |
| 3O1-BEB(F)—C | 15.0% |
| 4O1-BEB(F)—C | 13.0% |
| 5O1-BEB(F)—C | 13.0% |
| 2-HHB(F)—C | 15.0% |
| 3-HHB(F)—C | 15.0% |
| 3-HB(F)TB-2 | 4.0% |
| 3-HB(F)TB-3 | 4.0% |
| 3-HB(F)TB-4 | 4.0% |
| 3-HHB-O1 | 4.0% |

Physical properties of this liquid crystal composition were as follows:

$T_{NI}$=98.3 (° C.)

$\eta$=89.9 (mPa·s)

$\Delta n$=0.154

Δε=31.2

$V_{TH}$=0.87 (V)

| Composition Example 17 | |
|---|---|
| 1O1-HBB(2F)H-3 (compound No. 1-21) | 6.0% |
| 5-PyB—F | 4.0% |
| 3-PYB(F)—F | 6.0% |
| 2-BB—C | 5.0% |
| 4-BB—C | 4.0% |
| 5-BB—C | 5.0% |
| 2-PyB-2 | 2.0% |
| 3-PyB-2 | 2.0% |
| 4-PyB-2 | 2.0% |
| 6-PyB-O5 | 3.0% |
| 6-PyB-O6 | 3.0% |
| 6-PyB-O7 | 3.0% |
| 6-PyB-O8 | 3.0% |
| 3-PyBB—F | 6.0% |
| 4-PyBB—F | 6.0% |
| 5-PyBB—F | 6.0% |
| 3-HHB-1 | 6.0% |
| 2-H2BTB-2 | 4.0% |
| 2-H2BTB-3 | 4.0% |
| 2-H2BTB-4 | 5.0% |
| 3-H3BTB-2 | 5.0% |
| 3-H2BTB-3 | 5.0% |
| 3-H2BTB-4 | 5.0% |

Physical properties of this liquid crystal composition were as follows:

$T_{NI}$=95.7 (° C.)

η=35.6 (mPa·s)

Δn=0.204

Δε=6.8

$V_{TH}$=2.22 (V)

| Composition Example 18 | |
|---|---|
| 1O1-HBB(2F)2H-3 (compound No. 4-9) | 6.0% |
| 3-DB—C | 10.0% |
| 4-DB—C | 10.0% |
| 2-BEB—C | 12.0% |
| 3-BEB—C | 4.0% |
| 3-PyB(F)—F | 6.0% |
| 3-HEB-O4 | 8.0% |
| 4-HEB-O2 | 6.0% |
| 5-HEB-O1 | 6.0% |
| 3-HEB-O2 | 5.0% |
| 5-HEB-O2 | 4.0% |
| 5-HEB-5 | 5.0% |
| 4-HEB-5 | 5.0% |
| 1O-BEB-2 | 4.0% |
| 3-HHB-1 | 3.0% |
| 3-HHEBB—C | 2.0% |
| 3-HBEBB—C | 2.0% |
| 5-HBEBB—C | 2.0% |

Physical properties of this liquid crystal composition were as follows:

$T_{NI}$=68.9 (° C.)

η=38.2 (mPa·s)

Δn=0.121

Δε=11.0

$V_{TH}$=1.35 (V)

| Composition Example 19 | |
|---|---|
| 1O1-HBB(2F)H-3 (compound No. 1-21) | 10.0% |
| 1O1-HBB(2F)2H-3 (compound No. 4-9) | 6.0% |
| 1O1-HBB(2F, 3F)H-3 (compound No. 1-24) | 4.0% |
| 3-HB—C | 18.0% |
| 7-HB—C | 3.0% |
| 1O1-HB—C | 10.0% |
| 3-HB(F)—C | 10.0% |
| 3-HB-O2 | 8.0% |
| 2-PyB-2 | 2.0% |
| 3-PyB-2 | 2.0% |
| 4-PyB-2 | 2.0% |
| 1O1-HH-3 | 7.0% |
| 2-BTB O1 | 7.0% |
| 3-H2BTB-2 | 3.0% |
| 3-H2BTB-3 | 3.0% |
| 3-PyBH-3 | 2.0% |
| 3-PyBB-2 | 3.0% |

Physical properties of this liquid crystal composition were as follows:

$T_{NI}$=84.3 (° C.)

η=23.6 (mPa·s)

Δn=0.142

Δε=7.8

$V_{TH}$=1.79 (V)

| Composition Example 20 | |
|---|---|
| 1O1-HBB(2F)H-3 (compound No. 1-21) | 5.0% |
| 1O1-HBB(2F)2H-3 (compound No. 4-9) | 5.0% |
| 2O1-BEB(F)—C | 5.0% |
| 3O1-BEB(F)—C | 12.0% |
| 5O1-BEB(F)—C | 4.0% |
| 1V2-BEB(F, F)—C | 10.0% |
| 3-HH—EMe | 10.0% |
| 3-HB—O2 | 18.0% |
| 7-HEB—F | 2.0% |
| 3-HHEB—F | 2.0% |
| 5-HHEB—F | 2.0% |
| 3-HBEB—F | 4.0% |
| 2O1-HBEB(F)—C | 2.0% |
| 3-HB(F)EB(F)—C | 2.0% |
| 3-HBEB(F, F)—C | 2.0% |
| 3-HHB—F | 4.0% |
| 3-HHB-O1 | 4.0% |
| 3-HHB-3 | 3.0% |
| 3-HEBEB—F | 2.0% |
| 3-HEBEB-1 | 2.0% |

Physical properties of this liquid crystal composition were as follows:

$T_{NI}$=84.2 (° C.)

η=38.5 (mPa·s)

Δn=0.121

$\Delta\epsilon = 23.6$ $V_{TH} = 1.02$ (V)

| Composition Example 21 | |
|---|---|
| 1O1-HBB(2F)H-3 (compound No. 1-21) | 7.0% |
| 2O1-BEB(F)—C | 5.0% |
| 3O1-BEB(F)—C | 12.0% |
| 5O1-BEB(F)—C | 4.0% |
| 1V2-BEB(F, F)—C | 16.0% |
| 3-HB—O2 | 11.0% |
| 3-HH-4 | 3.0% |
| 3-HHB—F | 3.0% |
| 3-HHB-O1 | 4.0% |
| 3-HBEB—F | 4.0% |
| 3-HHEB—F | 7.0% |
| 5-HHEB—F | 7.0% |
| 3-H2BTB-2 | 4.0% |
| 3-H2BTB-3 | 4.0% |
| 3-H2BTB-4 | 4.0% |
| 3-HB(F)TB-2 | 5.0% |

Physical properties of this liquid crystal composition were as follows:

$T_{NI} = 96.3$ (° C.)

$\eta = 42.3$ (mPa·s)

$\Delta n = 0.146$ $\Delta\epsilon = 28.4$ $V_{TH} = 1.02$ (V)

| Composition Example 22 | |
|---|---|
| 1O1-HBB(2F)2H-3 (compound No. 4-9) | 7.0% |
| 2-BEB—C | 12.0% |
| 3-BEB—C | 4.0% |
| 4-BEB—C | 6.0% |
| 3-HB—C | 28.0% |
| 3-HEB—O4 | 12.0% |
| 4-HEB—O2 | 8.0% |
| 5-HEB—O1 | 8.0% |
| 3-HEB—O2 | 6.0% |
| 5-HEB—O2 | 5.0% |
| 3-HHB—O1 | 4.0% |

Physical properties of this liquid crystal composition were as follows:

$T_{NI} = 66.6$ (° C.)

$\eta = 28.3$ (mPa·s)

$\Delta n = 0.116$ $\Delta\epsilon = 10.1$ $V_{TH} = 1.37$ (V)

| Composition Example 23 | |
|---|---|
| 1O1-HBB(2F)H-3 (compound No. 1-21) | 8.0% |
| 1O1-HBB(2F)2H-3 (compound No. 4-9) | 3.0% |
| 1O1-HBB(2F, 3F)H-3 (compound No. 1-24) | 3.0% |
| 2-HB—C | 5.0% |
| 3-HB-C | 12.0% |
| 3-HB—O2 | 19.0% |
| 2-BTB-1 | 3.0% |

| -continued | |
|---|---|
| Composition Example 23 | |
| 3-HHB-1 | 4.0% |
| 3-HHB—F | 4.0% |
| 3-HHB—O1 | 5.0% |
| 3-HHEB—F | 4.0% |
| 5-HHEB—F | 4.0% |
| 2-HHB(F)—F | 7.0% |
| 3-HHB(F)—F | 7.0% |
| 5-HHB(F)—F | 7.0% |
| 3-HHB(F, F)—F | 5.0% |

Physical properties of this liquid crystal composition were as follows:

$T_{NI} = 106.4$ (° C.)

$\eta = 23.5$ (mPa·s)

$\Delta n = 0.104$ $\Delta\epsilon = 4.7$ $V_{TH} = 2.57$ (V)

| Composition Example 24 | |
|---|---|
| 1O1-HBB(2F)H-3 (compound No. 1-21) | 5.0% |
| 3-BEB(F)—C | 8.0% |
| 3-HB—C | 8.0% |
| V-HB—C | 8.0% |
| 1V-HB—C | 8.0% |
| 3-HB-O2 | 5.0% |
| 3-HH-2V | 14.0% |
| 3-HH-2V1 | 7.0% |
| V2-HHB-1 | 8.0% |
| 3-HHB-1 | 5.0% |
| 3-HHEB—F | 7.0% |
| 3-H2BTB-2 | 6.0% |
| 3-H2BTB-3 | 6.0% |
| 3-H2BTB-4 | 5.0% |

Physical properties of this liquid crystal composition were as follows:

$T_{NI} = 100.8$ (° C.)

$\eta = 17.5$ (mPa·s)

$\Delta n = 0.135$ $\Delta\epsilon = 8.4$ $V_{TH} = 2.22$ (V)

| Composition Example 25 | |
|---|---|
| 1O1-HBB(2F)H-3 (compound No. 1-21) | 5.0% |
| 2-HHB(F)—F | 17.0% |
| 3-HHB(F)—F | 17.0% |
| 5-HHB(F)—F | 16.0% |
| 2-H2HB(F)—F | 10.0% |
| 3-H2HB(F)—F | 5.0% |
| 5-H2HB(F)-F | 5.0% |
| 2-HBB(F)—F | 6.0% |
| 3-HBB(F)—F | 6.0% |
| 5-HBB(F)—F | 13.0% |

Physical properties of this liquid crystal composition were as follows:

$T_{NI} = 108.3$ (° C.)

$\eta = 27.3$ (mPa·s)

$\Delta n = 0.098$

Δε=4.9

$V_{TH}$=2.30 (V)

When 0.3 parts by weight of CN was added to 100 parts by weight of the above composition, pitch (P) was found to be 76 μm.

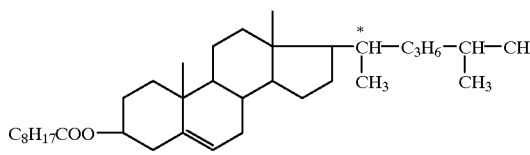

| Composition Example 26 | |
|---|---|
| 1O1-HBB(2F)H-3 (compound No. 1–21) | 5.0% |
| 7-HB(F, F)—F | 5.0% |
| 3-HB—O2 | 7.0% |
| 2-HHB(F)—F | 10.0% |
| 3-HHB(F)—F | 10.0% |
| 5-HHB(F)—F | 10.0% |
| 2-HBB(F)—F | 9.0% |
| 3-HBB(F)—F | 9.0% |
| 5-HBB(F)—F | 16.0% |
| 2-HBB—F | 4.0% |
| 3-HBB(F, F)—F | 5.0% |
| 5-HBB(F, F)—F | 10.0% |

Physical properties of this liquid crystal composition were as follows:

$T_{NI}$=87.1 (° C.)

η=25.7 (mPa·s)

Δn=0.114

Δε=5.7

$V_{TH}$=2.00 (V)

| Composition Example 27 | |
|---|---|
| 1O1-HBB(2F)2H-3 (compound No. 4–9) | 4.0% |
| 3-HB—CL | 10.0% |
| 5-HB—CL | 4.0% |
| 7-HB—CL | 4.0% |
| 1O1-HH-5 | 5.0% |
| 2-HBB(F)—F | 8.0% |
| 3-HBB(F)—F | 8.0% |
| 5-HBB(F)—F | 14.0% |
| 4-HHB—CL | 8.0% |
| 5-HHB—CL | 8.0% |
| 3-H2HB(F)-CL | 4.0% |
| 3-HBB(F, F)—F | 10.0% |
| 5-H2BB F, F)—F | 9.0% |
| 3-HB(F)VB-2 | 4.0% |

Physical properties of this liquid crystal composition were as follows:

$T_{NI}$=93.1 (° C.)

η=21.9 (mPa·s)

Δn=0.126

Δε=4.9

$V_{TH}$=2.33 (V)

| Composition Example 28 | |
|---|---|
| 1O1-HBB(2F)H-3 (compound No. 1–21) | 6.0% |
| 3-HHB(F, F)–F | 9.0% |
| 3-H2HB(F, F)—F | 8.0% |
| 4-H2HB(F, F)—F | 8.0% |
| 5-H2HB(F, F)—F | 6.0% |
| 3-HBB(F, F)—F | 21.0% |
| 5-HBB(F, F)—F | 20.0% |
| 3-H2BB(F, F)—F | 10.0% |
| 5-HHBB(F, F)—F | 3.0% |
| 5-HHEBB—F | 2.0% |
| 3-HH2BB(F, F)—F | 3.0% |
| 1O1-HBBH-4 | 2.0% |
| 1O1-HBBH-5 | 2.0% |

Physical properties of this liquid crystal composition were as follows:

$T_{NI}$=100.0 (° C.)

η35.9 (mPa·s)

Δn=0.117

Δε=8.8

$V_{TH}$=1.80 (V)

| Composition Example 29 | |
|---|---|
| 1O1-HBB(2F)H-3 (compound No. 1–21) | 3.0% |
| 1O1-HBB(2F)2H-3 (compound No. 4–9) | 3.0% |
| 5-HB—F | 12.0% |
| 6-HB—F | 9.0% |
| 7-HB—F | 7.0% |
| 2-HHB—OCF3 | 7.0% |
| 3-HHB—OCF3 | 7.0% |
| 4-HHB—OCF3 | 7.0% |
| 5-HHB—OCF3 | 5.0% |
| 3-HH2B—OCF3 | 4.0% |
| 3-HHB(F, F)—OCF3 | 5.0% |
| 3-HBB(F)—F | 10.0% |
| 5-HBB(F)—F | 10.0% |
| 3-HH2B(F)—F | 3.0% |
| 3-HB(F)BH-3 | 2.0% |
| 5-HBBH-3 | 2.0% |
| 3-HHB(F, F)-OCF2H | 4.0% |

Physical properties of this liquid crystal composition were as follows:

$T_{NI}$=88.2 (° C.)

η=16.1 (mPa·s)

Δn=0.094

Δε=4.3

$V_{TH}$=2.43 (V)

| Composition Example 30 | |
|---|---|
| 1O1-HBB(2F)H-3 (compound No. 1–21) | 8.0% |
| 1O1-HBB(2F)2H-3 (compound No. 4–9) | 2.0% |
| 2-HHB(F)—F | 2.0% |
| 3-HHB(F)—F | 2.0% |

-continued

| Composition Example 30 | |
|---|---|
| 5-HHB(F)—F | 2.0% |
| 2-HBB(F)—F | 6.0% |
| 3-HBB(F)—F | 6.0% |
| 5-HBB(F)—F | 10.0% |
| 2-H2BB(F)—F | 8.0% |
| 3-H2BB(F)—F | 7.0% |
| 3-HBB(F, F)—F | 25.0% |
| 5-HBB(F, F)—F | 19.0% |
| 1O1-HBBH-4 | 3.0% |

Physical properties of this liquid crystal composition were as follows:

$T_{NI}$=100.3 (° C.)

η=37.0 (mPa·s)

Δn=0.135

Δε=7.1

$V_{TH}$=1.97 (V)

| Composition Example 31 | |
|---|---|
| 1O1-HBB(2F)H-3 (compound No. 1–21) | 3.0% |
| 1O1-HBB(2F)2H-3 (compound No. 4–9) | 3.0% |
| 3-H2HB(F, F)—F | 7.0% |
| 5-H2HB(F, F)—F | 8.0% |
| 3-HHB(F, F)—F | 10.0% |
| 4-HHB(F, F)—F | 5.0% |
| 3-HH2B(F, F)—F | 6.0% |
| 5-HH2B(F, F)—F | 6.0% |
| 3-HBB(F, F)—F | 15.0% |
| 5-HBB(F, F)—F | 15.0% |
| 3-HBEB(F, F)—F | 2.0% |
| 4-HBEB(F, F)—F | 2.0% |
| 5-HBEB(F, F)—F | 2.0% |
| 3-HHEB(F, F)—F | 10.0% |
| 4-HHEB(F, F)—F | 3.0% |
| 5-HHEB(F, F)—F | 3.0% |

Physical properties of this liquid crystal composition were as follows:

$T_{NI}$=90.6 (° C.)

η=34.0 (mPa·s)

Δn=0.098

Δε=10.7

$V_{TH}$=1.83 (V)

| Composition Example 32 | |
|---|---|
| 1O1-HBB(2F)H-3 (compound No. 1–21) | 2.0% |
| 1O1-HBB(2F)2H-3 (compound No. 4–9) | 3.0% |
| 1O1-HBB(2F, 3F)H-3 (compound No. 1–24) | 5.0% |
| 3-HH-4 | 5.0% |
| 3-HH-O1 | 6.0% |
| 3-HH-O3 | 6.0% |
| 3-HB—O1 | 5.0% |
| 3-HB—O2 | 10.0% |
| 3-HB(2F, 3F)—O2 | 10.0% |
| 5-HB(2F, 3F)—O2 | 10.0% |
| 3-HHB(2F, 3F)—O2 | 12.0% |
| 5-HHB(2F, 3F)—O2 | 13.0% |
| 3-HHB(2F, 3F)-2 | 4.0% |
| 2-HHB(2F, 3F)-1 | 4.0% |
| 3-HHEH-3 | 5.0% |

Physical properties of this liquid crystal composition were as follows:

$T_{NI}$=90.1 (° C.)

Δn=0.089

Δε=−3.5

$V_{TH}$=(V)

Feasibility for the Industrial Use

The compound of the formula (1) according to the present invention has broader temperature range of nematic phase, lower viscosity and higher miscibility with other liquid crystal compounds at low temperature than those of conventional liquid crystal compounds, and the compound has high chemical stability.

For example, as shown in the following table, the compound of the formula (1) according to the present invention has remarkably broad temperature range of nematic phase, compared to conventionally used liquid crystal compounds.

| Structure of Compounds | Phase transition Temperature (C°)/ Temperature Range of Nematic Phase (C°) |
|---|---|
| 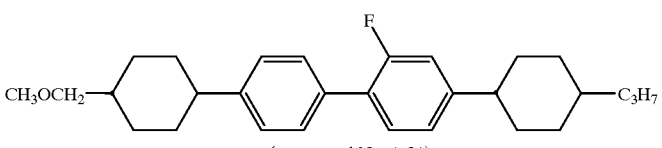(compound No. 1-21) | C 73.8 S 129.2 N 311.71/182.5 |
| 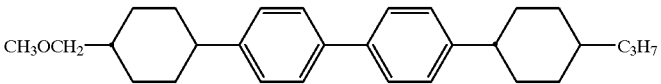(J.P. KOKOKU No. Hei 3-16331) | C 46.1 S 191.3 N 320.01/128.7 |

-continued

| Structure of Compounds | Phase transition Temperature (C°)/<br>Temperature Range of Nematic Phase (C°) |
|---|---|
| 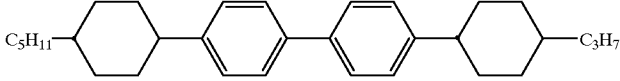<br>(J.P. KOKOKU No. Sho 62-46527) | C 54.0 S 251.0 N 311.01/60.0 |
| 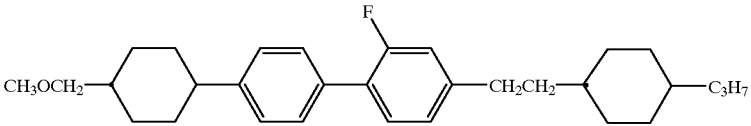<br>(compound No. 4-9) | C 114.2 N 235.61/121.4 |

Both the compounds disclosed in J.P. KOKOKU No. Hei 3-16331 and J.P. KOKOKU No. Sho 62-46527 are liquid crystal compounds which are most commonly used at present. These compounds have nematic phase, however either compound has high S-N point, that it, the compound of J.P. KOKOKU No. Hei 3-16331 has S-N point of 191.3° C. and the compound of J.P. KOKOKU No. Sho 62-46527 has S-N point of 251.0° C., and therefore, it is disadvantageous that smectic phase is expressed when these compounds are used as components in a liquid crystal composition in a large amount. Both compounds exhibit temperature range of nematic phase of 128.7° C. and 60° C., respectively, and these values are not enough broad temperature range of nematic phase.

In contrast, the compound of the formula (1) according to the present invention has enough favorable characteristics. The compound No. 1 is exemplified in the table, this compound has low S-N point such as 129.2° C., and remarkably broad temperature range of nematic phase such as 182.5° C.

Furthermore, the compound which has other groups than a covalent bond as a bonding group did not express smectic phase at all. The compound No. 4-9 is exemplified as a compound which has a 1,2-ethylene group as a bonding group, and this compound never expressed smectic phase at lower temperature region of nematic phase and exhibited desired nematic phase at very broad temperature range of 121.4° C.

Further, as shown in the above Composition Examples, the use of the compound of the present invention makes it possible to prepare a liquid crystal composition having excellent characteristics such as broader operating temperature range than those of known liquid crystal compositions.

What is claimed is:

1. A compound represented by the following general formula (1):

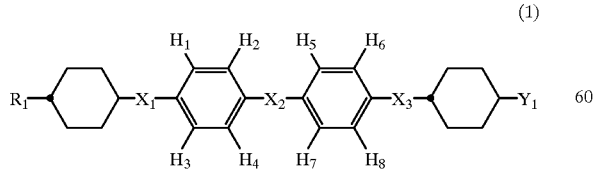

(1)

wherein $H_1$, $H_2$, $H_3$, $H_4$, $H_5$, $H_6$, $H_7$ and $H_8$ represent independently a hydrogen atom or a halogen atom, provided that at least one of them is a halogen atom; $R_1$ represents a moiety which is an alkyl group having 2 to 20 carbon atoms provided that one or more methylene groups (—$CH_2$—) which are not successive in the alkyl group are replaced with an oxygen atom (—O—) in the form of ether, and provided that an alkoxy group having 1 to 19 carbon atoms is exluded; $Y_1$ represents an alkyl group having 1 to 20 carbon atoms, and one or more methylene groups in $Y_1$ independently may be replaced with an oxygen atom, a sulfur atom, a dihydroxysilyl group, a dimethylsilylene group, —CH=CH— or —C≡C—; $X_1$, $X_2$ and $X_3$ represent independently a covalent bond, a 1,2-ethylene group or a 1,4-butylene group.

2. The compound according to claim 1 wherein $Y_1$ is an alkyl group having 1 to 20 carbon atoms.

3. The compound according to claim 1 wherein $H_1$, $H_2$, $H_3$, $H_4$, $H_5$, $H_6$, $H_7$ and $H_8$ represent independently a hydrogen atom or a halogen atom, provided that at least one of them is a fluorine atom.

4. The compound according to claim 1 wherein $X_1$, $X_2$ and $X_3$ represent independently a covalent bond.

5. The compound according to claim 1 wherein any one of $X_1$, $X_2$ and $X_3$ represents a 1,2-ethylene group.

6. A liquid crystal composition comprising at least one compound according to claim 1.

7. A liquid crystal composition comprising at least one compound according to claim 1 as a first component, and as a second component at least one compound selected from the group consisting of the compounds of the formula (2), (3) or (4):

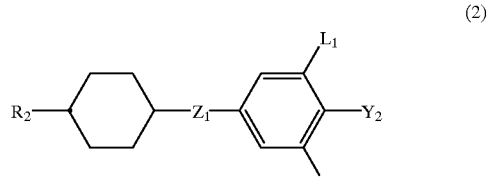

(2)

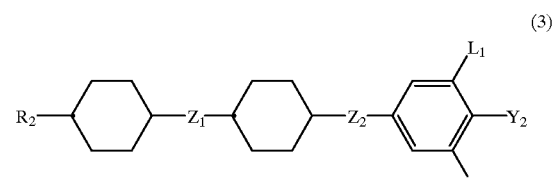

(3)

-continued (4)

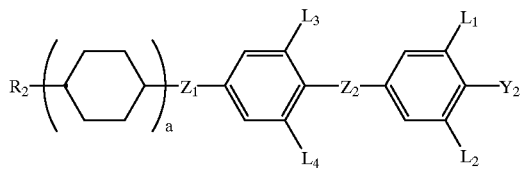

wherein $R_2$ represents an alkyl group having 1 to 10 carbon atoms; $Y_2$ represents a fluorine atom, a chlorine atom, $OCF_3$, $OCF_2H$, $CF_3$, $CF_2H$ or $CFH_2$; $L_1$, $L_2$, $L_3$ and $L_4$ represent independently a hydrogen atom or a fluorine atom; $Z_1$ and $Z_2$ represent independently a 1,2-ethylene group, —CH=CH— or a covalent bond; and a is 1 or 2.

8. A liquid crystal composition comprising at least one compound according to claim 1 as a first component, and as a second component at least one compound selected from the group consisting of the compounds of the formula (5), (6), (7), (8) or (9):

(5)

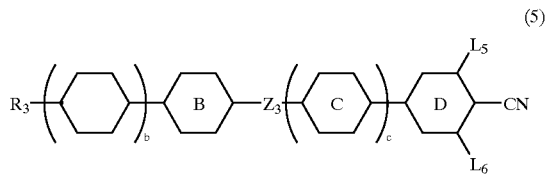

wherein $R_3$ is a fluorine atom, an alkyl group having 1 to 10 carbon atoms or an alkenyl group having 2 to 10 carbon atoms, and any methylene group in said alkyl or alkenyl group may be replaced by one or more oxygen atoms (—O—), provided that two or more successive methylene groups are not replaced by oxygen atoms; ring B represents 1,4-cyclohexylene, 1,4-phenylene or 1,3-dioxane-2,5-diyl; ring C represents 1,4-cyclohexylene, 1,4-phenylene or pyrimidine-2,5-diyl; ring D represents 1,4-cyclohexylene or 1,4-phenylene; $Z_3$ represents a 1,2-ethylene group, —COO— or a covalent bond; $L_5$ and $L_6$ represent independently a hydrogen atom or a fluorine atom; and b and c represent independently 0 or 1, (6)

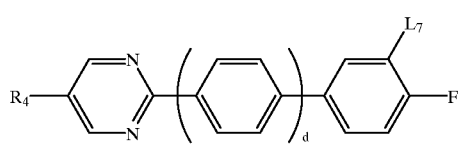

wherein $R_4$ represents an alkyl group having 1 to 10 carbon atoms; $L_7$ represents a hydrogen atom or a fluorine atom; and d represents 0 or 1, (7)

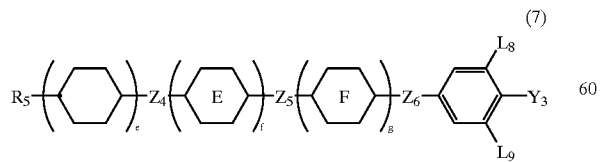

wherein $R_5$ represents an alkyl group having 1 to 10 carbon atoms, ring E and ring F represent independently 1,4-cyclohexylene or 1,4-phenylene; $Z_4$ and $Z_5$ represent independently —COO— or a covalent bond; $Z_6$ represents —COO— or —C≡C—; $L_8$ and $L_9$ represent independently a hydrogen atom or a fluorine atom; $Y_3$ represents a fluorine atom, $OCF_3$, $OCF_2H$, $CF_3$, $CF_2H$ or $CFH_2$; and e, f and g represent independently 0 or 1, (8)

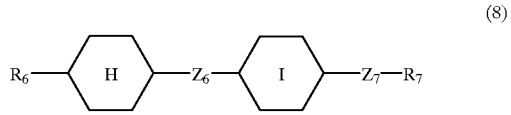

wherein $R_6$ and $R_7$ represent independently an alkyl group having 1 to 10 carbon atoms or an alkenyl group having 2 to 10 atoms, and any methylene group in said alkyl or alkenyl group may be replaced by one or more oxygen atoms, provided that two or more successive methylene groups are not replaced by oxygen atoms; ring H represents 1,4-cyclohexylene, 1,4-phenylene or pyrimidine-2,5-diyl; ring I represents 1,4-cyclohexylene or 1,4-phenylene; $Z_6$ represents —C≡C—, —COO—, a 1,2-ethylene group, —CH=CH—C≡C— or a covalent bond; and $Z_7$ represents —COO— or a covalent bond, (9)

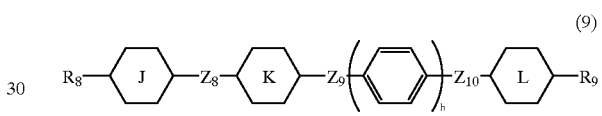

wherein $R_8$ and $R_9$ represent independently an alkyl group having 1 to 10 carbon atoms or an alkenyl group having 2 to 10 atoms, and any methylene group in said alkyl or alkenyl group may be replaced by one or more oxygen atoms, provided that two or more successive methylene groups are not replaced by oxygen atoms; ring J represents 1,4-cyclohexylene, 1,4-phenylene or pyrimidine-2,5-diyl; ring K represents 1,4-cyclohexylene, 1,4-phenylene wherein at least one or more hydrogen atoms on the ring are optionally substituted by fluorine atoms, or pyrimidine-2,5-diyl; ring L represents 1,4-cyclohexylene or 1,4-phenylene; $Z_8$ and $Z_{10}$ present independently —COO—, a 1,2-ethylene group or a covalent bond; $Z_9$ represents —CH=CH—, —C≡C—, —COO— or a covalent bond; and h represents 0 or 1.

9. A liquid crystal composition comprising at least one compound according to claim 1 as a first component, and as a second component at least one compound selected from the group consisting of the components of the formula (2), (3) or (4), and at least one compound selected from the group consisting of the compounds of the formula (5), (6), (7), (8) or (9), (2)

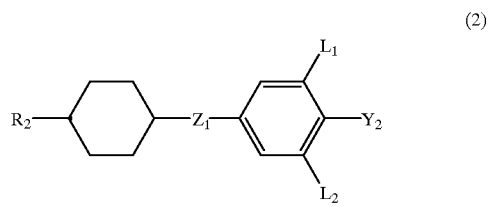

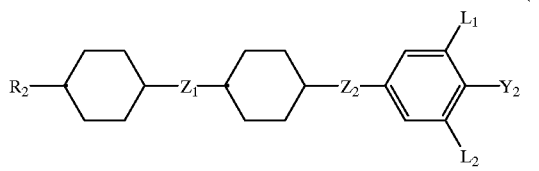
(3)

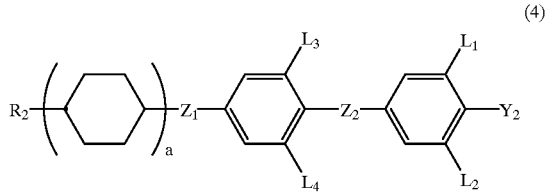
(4)

wherein $R_2$ represents an alkyl group having 1 to 10 carbon atoms; $Y_2$ represents a fluorine atom, a chlorine atom, $OCF_3$, $OCF_2H$, $CF_3$, $CF_2H$ or $CFH_2$; $L_1$, $L_2$, $L_3$ and $L_4$ represent independently a hydrogen atom or a fluorine atom; $Z_1$ and $Z_2$ represent independently a 1,2-ethylene group, —CH=CH— or a covalent bond; and a is 1 or 2,

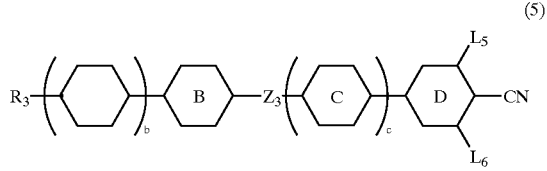
(5)

wherein $R_3$ is a fluorine atom, an alkyl group having 1 to 10 carbon atoms or an alkenyl group having 2 to 10 carbon atoms, and any methylene group in said alkyl or alkenyl group may be replaced by one or more oxygen atoms (—O—), provided that two or more successive methylene groups are not replaced by oxygen atoms; ring B represents 1,4-cyclohexylene, 1,4-phenylene or 1,3-dioxane-2,5-diyl; ring C represents 1,4-cyclohexylene, 1,4-phenylene or pyrimidine-2,5-diyl; ring D represents 1,4-cyclohexylene or 1,4-phenylene; $Z_3$ represents a 1,2-ethylene group, —COO— or a covalent bond; $L_5$ and $L_6$ represent independently a hydrogen atom or a fluorine atom; and b and c represent independently 0 or 1,

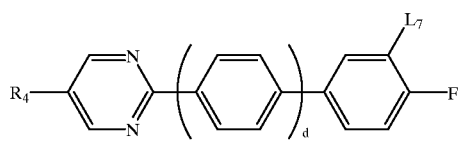
(6)

wherein $R_4$ represents an alkyl group having 1 to 10 carbon atoms; $L_7$ represents a hydrogen atom or a fluorine atom; and d represents 0 or 1,

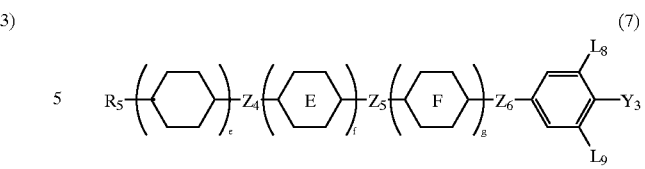
(7)

wherein $R_5$ represents an alkyl group having 1 to 10 carbon atoms, ring E and ring F represent independently 1,4-cyclohexylene or 1,4-phenylene; $Z_4$ and $Z_5$ represent independently —COO— or a covalent bond; $Z_6$ represents —COO— or —C≡C—; $L_8$ and $L_9$ represent independently a hydrogen atom or a fluorine atom; $Y_3$ represents a fluorine atom, $OCF_3$, $OCF_2H$, $CF_3$, $CF_2H$ or $CFH_2$; and e, f and g represent independently 0 or 1,

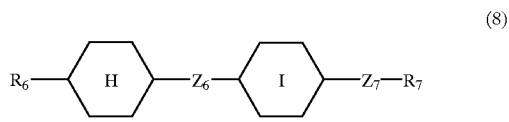
(8)

wherein $R_6$ and $R_7$ represent independently an alkyl group having 1 to 10 carbon atoms or an alkenyl group having 2 to 10 atoms, and any methylene group in said alkyl or alkenyl group may be replaced by one or more oxygen atoms, provided that two or more successive methylene groups are not replaced by oxygen atoms; ring H represents 1,4-cyclohexylene, 1,4-phenylene or pyrimidine-2,5-diyl; ring I represents 1,4-cyclohexylene or 1,4-phenylene; $Z_6$ represents —C≡C—, —COO—, a 1,2-ethylene group, —CH=CH—C≡C— or a covalent bond; and $Z_7$ represents —COO— or a covalent bond,

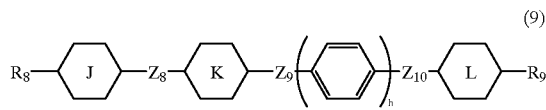
(9)

wherein $R_8$ and $R_9$ represent independently an alkyl group having 1 to 10 carbon atoms or an alkenyl group having 2 to 10 atoms, and any methylene group in said alkyl or alkenyl group may be replaced by one or more oxygen atoms, provided that two or more successive methylene groups are not replaced by oxygen atoms; ring J represents 1,4-cyclohexylene, 1,4-phenylene or pyrimidine-2,5-diyl; ring K represents 1,4-cyclohexylene, 1,4-phenylene wherein at least one or more hydrogen atoms on the ring are optionally substituted by fluorine atoms, or pyrimidine-2,5-diyl; ring L represents 1,4-cyclohexylene or 1,4-phenylene; $Z_8$ and $Z_{10}$ present independently —COO—, a 1,2-ethylene group or a covalent bond; $Z_9$ represents —CH=CH—, —C≡C—, —COO— or a covalent bond; and h represents 0 or 1.

10. A liquid crystal display element wherein the liquid crystal composition according to claim 6 is used.

* * * * *